(12) United States Patent
Amirkiai et al.

(10) Patent No.: US 9,612,414 B2
(45) Date of Patent: Apr. 4, 2017

(54) MULTI-CHANNEL OPTOELECTRONIC SUBASSEMBLIES

(71) Applicant: FINISAR CORPORATION, Sunnyvale, CA (US)

(72) Inventors: Maziar Amirkiai, Sunnyvale, CA (US); Mark Donovan, Mountain View, CA (US); Hongyu Deng, Saratoga, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 0 days.

(21) Appl. No.: 14/923,046

(22) Filed: Oct. 26, 2015

(65) Prior Publication Data

US 2016/0047998 A1     Feb. 18, 2016

Related U.S. Application Data

(63) Continuation of application No. 14/824,883, filed on Aug. 12, 2015.

(Continued)

(51) Int. Cl.
*G02B 6/12* (2006.01)
*G02B 6/43* (2006.01)
(Continued)

(52) U.S. Cl.
CPC ............. *G02B 6/43* (2013.01); *G02B 6/32* (2013.01); *G02B 6/3874* (2013.01);
(Continued)

(58) Field of Classification Search
CPC .......... G02B 6/43; G02B 6/32; G02B 6/3874; G02B 6/3885; G02B 6/4251; G02B 6/4292; G02B 6/4295
(Continued)

(56) References Cited

U.S. PATENT DOCUMENTS 5,586,207 A * 12/1996 Goodwin ............. G02B 6/4292
385/120
6,004,044 A * 12/1999 Paulus ................. G02B 6/4249
385/88

(Continued)

FOREIGN PATENT DOCUMENTS

JP     2007-271882 A     10/2007

OTHER PUBLICATIONS

Machine Translation of JP 2007-271882 A, Hiroyuki et al, "Optical Module and Manufacturing Method", Oct. 18, 2007.*
(Continued)

*Primary Examiner* — Ellen Kim
(74) *Attorney, Agent, or Firm* — Maschoff Brennan

(57) ABSTRACT

This disclosure generally relates to devices and methods involving optoelectronic subassemblies. In some aspects, the disclosed devices and methods may relate to a multi-channel optoelectronic subassembly including a multi-channel header subassembly with a plurality of optoelectronic transducers on a substrate, a housing defining a housing cavity and including an optically transmissive portion, a ferrule assembly retaining optical fibers and an alignment sleeve with a sleeve cavity sized and shaped to receive the ferrule assembly. At least one of the optoelectronic transducers may be configured to transmit and/or receive optical signals corresponding to one channel.

20 Claims, 18 Drawing Sheets

Related U.S. Application Data

(60) Provisional application No. 62/036,714, filed on Aug. 13, 2014, provisional application No. 62/039,758, filed on Aug. 20, 2014, provisional application No. 62/063,225, filed on Oct. 13, 2014, provisional application No. 62/069,707, filed on Oct. 28, 2014, provisional application No. 62/069,710, filed on Oct. 28, 2014, provisional application No. 62/069,712, filed on Oct. 28, 2014.

(51) Int. Cl.
*G02B 6/38* (2006.01)
*G02B 6/42* (2006.01)
*G02B 6/32* (2006.01)

(52) U.S. Cl.
CPC ......... *G02B 6/3885* (2013.01); *G02B 6/4251* (2013.01); *G02B 6/4292* (2013.01); *G02B 6/4295* (2013.01)

(58) Field of Classification Search
USPC .............................................. 385/14, 88–94
See application file for complete search history.

(56) References Cited

U.S. PATENT DOCUMENTS

| | | | | |
|---|---|---|---|---|
| 7,270,488 | B2 * | 9/2007 | Althaus | G02B 6/4206 385/139 |
| 7,420,754 | B2 * | 9/2008 | Nagasaka | G02B 6/4201 250/239 |
| 7,572,069 | B2 * | 8/2009 | Teo | G02B 6/4207 385/33 |
| RE44,664 | E * | 12/2013 | McColloch | 385/115 |
| 9,207,414 | B2 * | 12/2015 | Lin | G02B 6/423 |
| 9,297,972 | B2 * | 3/2016 | Logan, Jr. | G02B 6/4284 |
| 2001/0024551 | A1 | 9/2001 | Yonemura et al. | |
| 2001/0051026 | A1 | 12/2001 | Steinberg et al. | |
| 2004/0264884 | A1 | 12/2004 | Liu | |
| 2005/0175299 | A1 * | 8/2005 | Hargis | G02B 6/4206 385/93 |
| 2014/0205246 | A1 | 7/2014 | Li et al. | |

OTHER PUBLICATIONS

International Search Report and Written Opinion mailed Dec. 23, 2015 in related PCT Application No. PCT/US2015/057883 (13 pages).

* cited by examiner

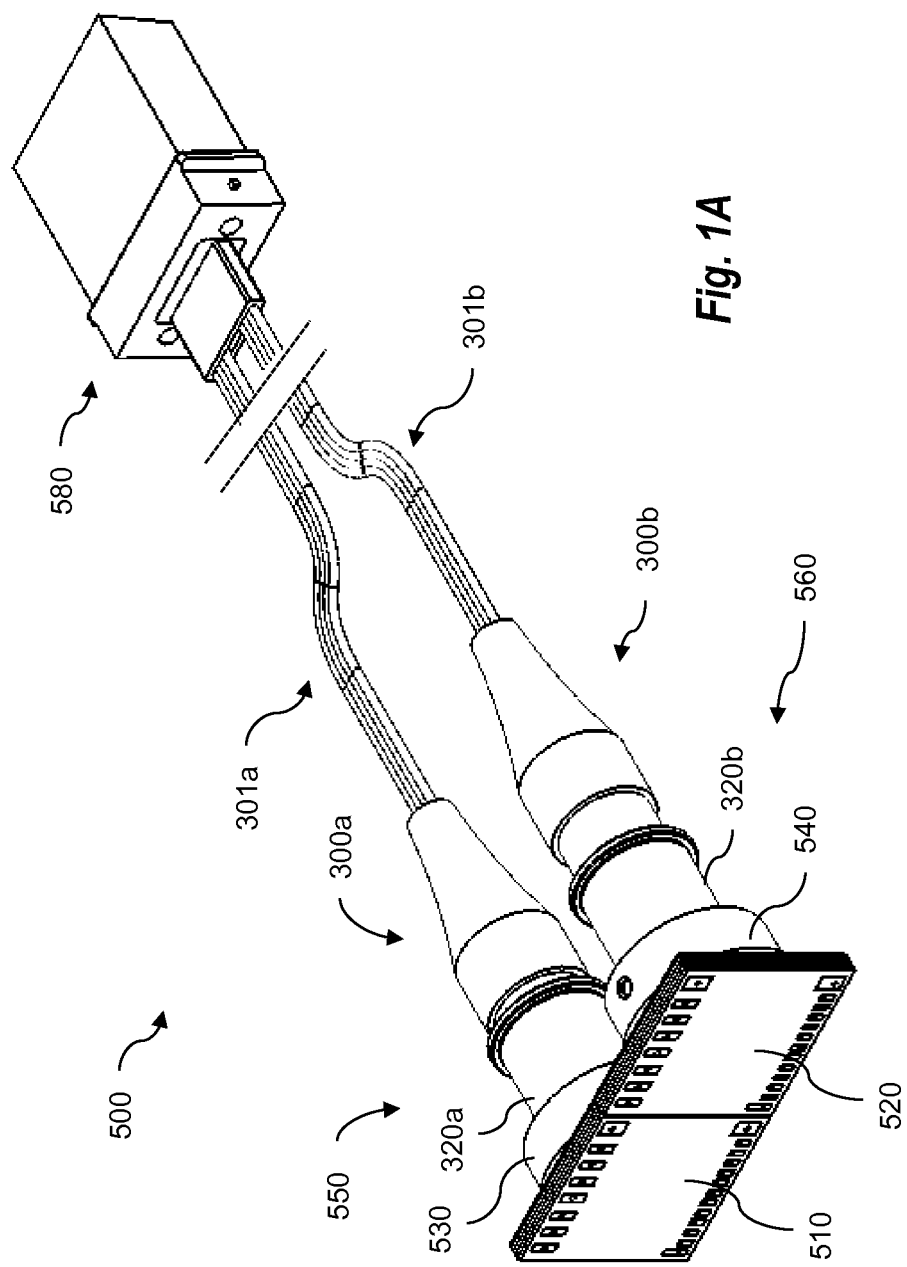

MULTI-CHANNEL OPTOELECTRONIC SUBASSEMBLIES

CROSS-REFERENCE TO RELATED APPLICATIONS

This application is a continuation of patent application Ser. No. 14/824,883, filed Aug. 12, 2015, entitled FERRULE ASSEMBLIES, which claims priority to U.S. Provisional Application 62/036,714, filed Aug. 13, 2014, entitled FERRULE ASSEMBLIES, U.S. Provisional Application 62/039,758, filed Aug. 20, 2014, entitled LENS RECEPTACLES, U.S. Provisional Application 62/063,225, filed Oct. 13, 2014, entitled MULTI-LENS OPTICAL COMPONENTS, U.S. Provisional Application 62/069,707 filed Oct. 28, 2014, entitled MULTI-CHANNEL OPTOELECTRONIC SUBASSEMBLIES, U.S. Provisional Application 62/069,710 filed Oct. 28, 2014, entitled MULTI-LAYER SUBSTRATES, and U.S. Provisional Application 62/069,712 filed Oct. 28, 2014, entitled SUBSTRATES INCLUDING OPTOELECTRONIC COMPONENTS; which are all incorporated by reference herein in their entirety.

BACKGROUND

The present disclosure relates to high-speed fiber optic networks that use light signals to transmit data over a network. Fiber optic networks have various advantages over other types of networks such as copper wire based networks. Many existing copper wire networks operate at near maximum possible data transmission rates and at near maximum possible distances for copper wire technology. Fiber optic networks are able to reliably transmit data at higher rates over further distances than is possible with copper wire networks.

The claimed subject matter is not limited to configurations that solve any disadvantages or that operate only in environments such as those described above. This background is only provided to illustrate examples of where the present disclosure may be utilized.

SUMMARY

In one example, a multi-channel optoelectronic subassembly may include a multi-channel header subassembly with a plurality of optoelectronic transducers on a substrate, a housing defining a housing cavity and including an optically transmissive portion, a ferrule assembly retaining optical fibers and an alignment sleeve with a sleeve cavity sized and shaped to receive the ferrule assembly. At least one of the optoelectronic transducers may be configured to transmit and/or receive optical signals corresponding to one channel.

In another example, a multi-channel optoelectronic subassembly may include: a ROSA including a ROSA header with receivers on a first substrate and a ROSA housing coupled to the ROSA header and may at least partially enclose the receivers within a ROSA housing cavity; a TOSA including a TOSA header with transmitters on a second substrate and a TOSA housing coupled to the TOSA header and may at least partially enclose the transmitters within a ROSA housing cavity; a first ferrule assembly that may retain first optical fibers and a second ferrule assembly retaining second optical fibers; and a first alignment sleeve with a first sleeve cavity sized and shaped to receive the first ferrule assembly and a second alignment sleeve with a second sleeve cavity sized and shaped to receive the second ferrule assembly.

In yet another example, a method may include: providing a ROSA header that may include receivers on a first substrate, at least one of the receivers may be configured to receive optical signals corresponding to one channel; providing a ROSA housing defining a ROSA housing cavity and including a first optically transmissive portion; providing a TOSA header that may include transmitters on a second substrate, at least one of the transmitters may be configured to transmit optical signals corresponding to one channel; providing a TOSA housing defining a TOSA housing cavity and including a second optically transmissive portion; providing a first ferrule assembly retaining first optical fibers and a second ferrule assembly retaining second optical fibers; and providing a first alignment sleeve with a first sleeve cavity sized and shaped to receive the first ferrule assembly and a second alignment sleeve with a second sleeve cavity sized and shaped to receive the second ferrule assembly.

This Summary is provided to introduce a selection of concepts in a simplified form that are further described below in the Detailed Description. This Summary is not intended to identify key features or essential characteristics of the disclosed subject matter, nor is it intended to be used as an aid in determining the scope of the claims. Additional features and advantages will be set forth in the description which follows, and in part will be obvious from the description, or may be learned by practice.

BRIEF DESCRIPTION OF THE DRAWINGS

FIG. 1A is a perspective view of an embodiment of an optoelectronic assembly.

DETAILED DESCRIPTION

Reference will be made to the drawings and specific language will be used to describe various aspects of the disclosure. Using the drawings and description in this manner should not be construed as limiting its scope. Additional aspects may be apparent in light of the disclosure, including the claims, or may be learned by practice.

The terms and words used in the following description and claims are not limited to the bibliographical meanings, but are merely used to enable a clear and consistent understanding of the disclosure. It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide.

The term "optoelectronic subassembly" may be used to refer to any portion of an optoelectronic assembly. However, at times this disclosure may use "optoelectronic subassembly" to refer to specific portions of an optoelectronic assembly, as may be indicated by context.

High-speed fiber optic networks use light signals (which may also be referred to as "optical signals") to transmit data over a network. Fiber optic networks have various advantages over other types of networks such as copper wire based networks. Many existing copper wire networks operate at near maximum possible data transmission rates and at near maximum possible distances for copper wire technology. Fiber optic networks are able to reliably transmit data at higher rates over further distances than is possible with copper wire networks.

Although fiber optic networks use optical signals to carry data, many electronic devices such as computers and other network devices use electrical signals. Optoelectronic assemblies may be used to convert electrical signals to optical signals, convert optical signals to electrical signals, or convert both electrical signals to optical signals and optical signals to electrical signals.

Figure 1B:
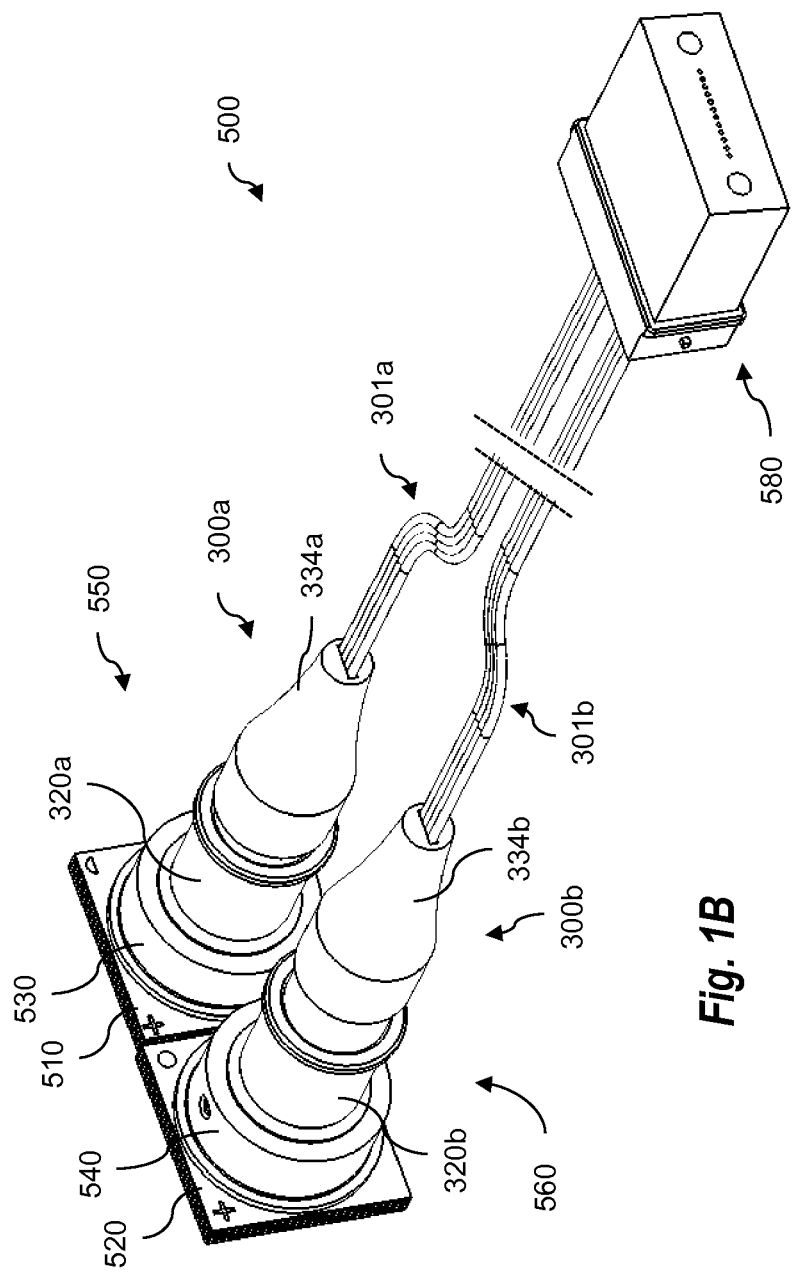
FIG. 1B is another perspective view of the optoelectronic assembly of FIG. 1A.

FIGS. 1A-1B illustrate an example of an optoelectronic assembly 500. Aspects of the optoelectronic assembly 500, which will be described in further detail below, may facilitate economical production of the optoelectronic assembly 500. For example, some aspects of the optoelectronic assembly 500 may simplify the alignment and/or assembly processes involving the optoelectronic assembly 500. Additionally or alternatively, aspects of the optoelectronic assembly 500 may decrease the costs of the materials used to produce the optoelectronic assembly 500. In yet another example, some aspects of the optoelectronic assembly 500 may decrease the necessary size of the hermetically sealed portions of the optoelectronic assembly 500. Additionally or alternatively, aspects of the optoelectronic assembly 500 may decrease the size or clearance of the optoelectronic assembly 500.

The optoelectronic assembly 500 may include optoelectronic subassemblies ("OSAs"), which may be used to refer to any portion of the optoelectronic assembly 500. However, at times this disclosure may use the "subassembly" to refer to specific portions of the optoelectronic assembly 500, as may be indicated by context. Specifically, the optoelectronic assembly 500 may include a receiver optoelectronic subassembly ("ROSA") 550 and/or a transmitter optoelectronic subassembly ("TOSA") 560. The ROSA 550 may be configured to receive optical signals from a fiber optic network and convert the optical signals into electrical signals. The TOSA 560 may be configured to receive electrical signals and transmits corresponding light signals to the fiber optic network. Although in the illustrated example the optoelectronic assembly 500 includes both a TOSA 560 and a ROSA 550, in other configurations optoelectronic assemblies may include either a TOSA or a ROSA, or one optoelectronic subassembly may be both a TOSA and a ROSA.

The TOSA 560 may be coupled to optical cables 301b via a ferrule assembly 300b and the ROSA 550 may be coupled to optical cables 301a via a ferrule assembly 300a (as indicated by the dashed lines, only a portion of the optical cables 301a-b is illustrated in the Figures). Optical signals may be transmitted through the optical cables 301a-b to and/or from the TOSA 560 and the ROSA 550. The ferrule assemblies 300a-b may physically and/or optically couple the optical cables 301a-b with the TOSA 560 and the ROSA 550. In some configurations, the ferrule assemblies 300a-b may be part of the TOSA 560 and the ROSA 550. The optical cables 301a-b may be coupled to a connector subassembly 580 (FIGS. 10A-10B) configured to couple the optoelectronic assembly 500 to other components of fiber optic networks.

The optoelectronic assembly 500 may include various components such as optical components and/or electronic components. Optical components involve optical signals and may, for example, emit, receive, transmit, carry, focus, and/or collimate optical signals. Electrical components involve electrical signals may, for example, receive, transmit, carry, transduce, transform, modulate, and/or amplify electronic signals. Optoelectronic components may involve both electrical and optical signals, and may be referred to as transducer components. Optoelectronic components may change optical signals to electrical signals and/or change electrical signals to optical signals (e.g., diodes or lasers).

The optoelectronic assembly 500 may include multiple channels and may be a multi-channel optoelectronic assembly. In such configurations, each channel of the optoelectronic assembly 500 may correspond to a set of one or more optical signals travelling through one of the optical cables 301a-b. As illustrated, the optoelectronic assembly 500 may be a four channel optoelectronic assembly capable of sending and/or receiving four channels of signals. Multi-channel optoelectronic assemblies may support increased data transfer rates through fiber optic networks. For example, the four channel optoelectronic assembly 500 may be able to send and receive data at data transfer rates of approximately four times the data transfer rate of a comparable single channel optoelectronic assembly.

The TOSA 560 may include a TOSA header 520 coupled to a TOSA housing 540 and the ROSA 550 may include a ROSA header 510 coupled to a ROSA housing 530. The ferrule assemblies 300a-b may be configured to retain the optical cables 301a-b and may include respective boots 334a-b surrounding a portion of the optical cables 301a-b. The TOSA housing 540 and the ROSA housing 530 may be coupled to respective ferrule assemblies 300a-b by alignment sleeves 320a and 320b. Additional details regarding the optoelectronic assembly 500 will be discussed in further detail below.

In some configurations, the optoelectronic assembly 500 may need to comply with certain standards that may specify aspects of optoelectronic assemblies such as size, power handling, component interfaces, operating wavelengths or other specifications. Examples of such standards include CFP, XAUI, QSFP, QSFP+, XFP, SFP and GBIC. Complying with such standards may limit the structure, size, cost, performance or other aspects of optoelectronic assembly designs. Such standards may also limit configurations of ferrule assemblies such as ferrule assemblies 300a-b and/or the connector subassembly 580.

The optoelectronic assembly 500 or portions of the optoelectronic assembly 500 may be produced in large quantities and the produced components may need to comply with specifications that specify various aspects of the produced components (e.g., shape, dimensions and/or positioning). The produced components may include variations in the specifications. Some variation in specifications may be permitted because the produced components may be suitable or work properly. Some variations in specifications may result in components that are unsuitable. Tolerance may refer to an allowable amount of variation of a specification (e.g., dimension or positioning). Some specifications may have higher ("wider") or lower ("tighter") tolerance. For example, outside dimensions of optoelectronic subassemblies may have a wider tolerance because the variations may not affect the operation of the produced optoelectronic subassemblies. In another example, the positioning of optical components may require a tighter tolerance because the positioning affects the focus and/or transmission of optical signals.

The selected production processes may affect the prevalence and extent of the variations. In some circumstances the production processes may be controlled to increase or decrease the range of variation, the frequency of the variations, or other aspects. In some circumstances, producing components to tighter tolerances may increase production costs (or vice versa). For example, the tighter tolerance production processes may be more expensive than wider tolerance production processes. Tighter tolerance may result in more unsuitable components. Unsuitable components may be discarded without recovering production costs or repaired adding to production costs. Production processes may be modified to decrease or eliminate the production of unsuitable components, but in some circumstances this may increase costs.

Figure 2A:
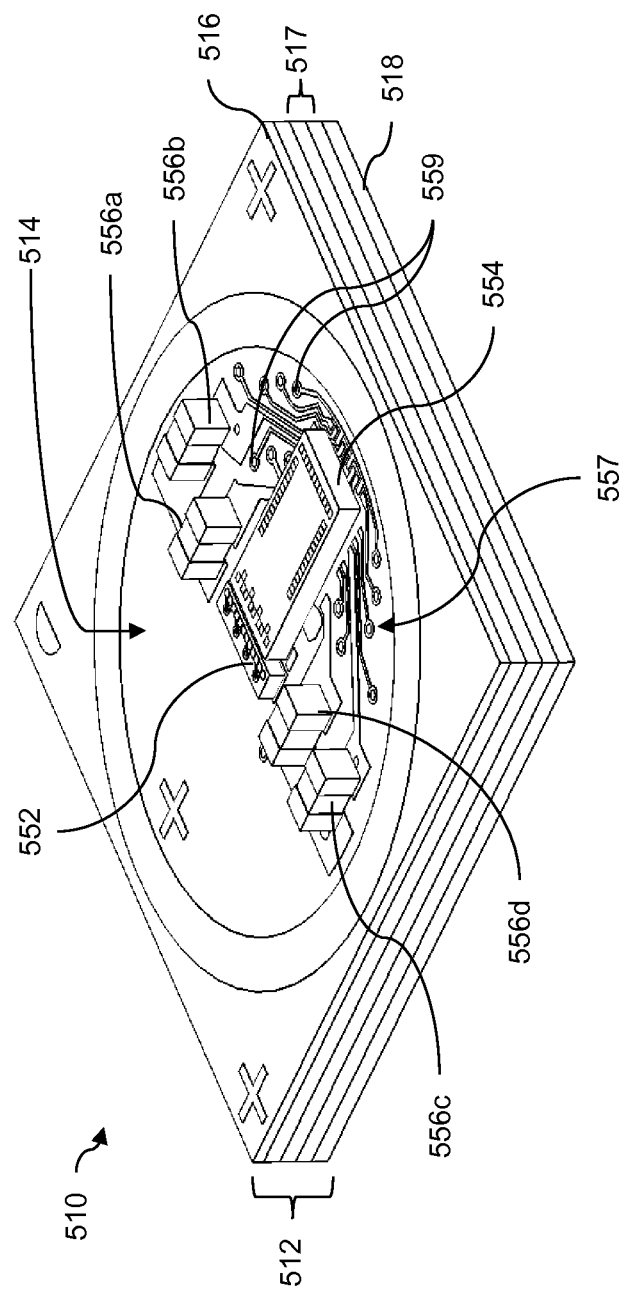
FIG. 2A is a perspective view of an embodiment of a header subassembly.
Figure 2B:
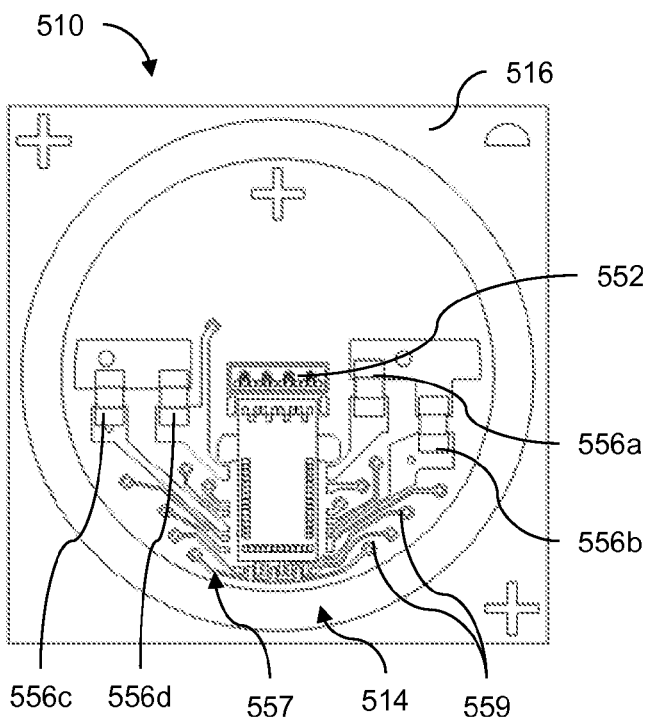
FIG. 2B is a top view of the header subassembly of FIG. 2A.
Figure 2C:
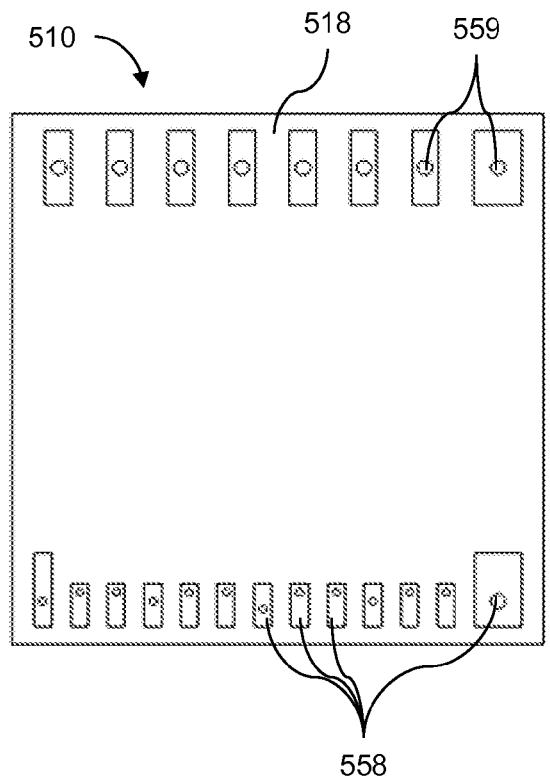
FIG. 2C is a bottom view of the header subassembly of FIG. 2A.

With reference to FIGS. 2A-2C, the ROSA header 510 will be described in further detail. The ROSA header 510 may include a substrate 512 and optoelectronic components 514 coupled to or formed on the substrate 512. In some configurations, the substrate 512 may be a multi-layer substrate with intermediate layers 517 positioned between a top layer 516 and a bottom layer 518.

The optoelectronic components 514 may include any suitable components that may be used in ROSAs and/or other optoelectronic subassemblies. More specifically, the optoelectronic components 514 may include electrical components (e.g., integrated circuits, drivers, amplifiers, capacitors, control circuits, and/or others), optical components (e.g., lenses, prisms, mirrors, filters, and/or others) and/or one or more receivers (e.g., receiver array, photodiodes, phototransistors, photoresistors, photodetector, and/or others). The optoelectronic components 514 may be configured to receive optical signals from fiber optic networks via the optical cables 301a and/or the connector subassembly 580. Additionally or alternatively, the optoelectronic components 514 may be configured to convert optical signals to electrical signals and thus may be optoelectronic transducers.

As illustrated, in some configurations the optoelectronic components 514 may include a receiver array 552, an integrated circuit 554, and/or electrical components 556a, 556b, 556c, 556d. The electrical components 556a-d may include integrated circuits, control circuits, drivers, amplifiers, inductors, capacitors and/or other suitable optoelectronic components. In some configurations, electrical components such as 556a-d may be positioned on the bottom layer 518. The receiver array 552 may be configured to receive optical signals and convert the optical signals to corresponding electrical signals. In some configurations, the receiver array 552 includes a plurality of receivers, each capable of receiving sets of optical signals corresponding to one channel.

Some or all of the optoelectronic components 514 (e.g., receiver array 552, the integrated circuit 554, and/or the electrical components 556a-d) may be electrically or optically coupled to one another. For example, the optoelectronic components 514 may be coupled to one another by signal lines 557, contact pads 558, vias 559, wire bonds, or other suitable interconnections, as will be discussed in further detail below. In some configurations, the intermediate layers 517 may include thick film traces of conductive material formed by thick film metallization.

Signal lines 557 may be positioned on the top layer 516 and may be formed of electrically conductive material to couple at least some of the optoelectronic components 514. The signal lines 557 may be thick film signal lines 557 formed by thick film metallization. Contact pads 558 may be positioned on the bottom layer 518 and may be formed of electrically conductive material to permit electrical power and/or control signals to be transmitted to the ROSA header 510 and/or the optoelectronic components 514. The contact pads 558 may be capable of engaging flex circuits, printed circuit boards ("PCBs"), other connectors and/or electronic subassemblies. The contact pads 558 may be thick film contact pads 558 formed by thick film metallization or thin film contact pads 558 formed by thin film metallization.

The vias 559 of conductive material (only some of which are labeled in the Figures for clarity) may extend through a portion of the substrate 512. For example, one or more of the vias 559 may extend through one or more of: the bottom layer 518, at least one of the intermediate layers 517, and/or the top layer 516 (see for example, FIG. 9B). Some of the vias 559 may be electrically coupled to the contact pads 558, the signal lines 557, and/or the optoelectronic components 514. The vias 559 may permit power and/or control signals to travel between the contact pads 558, the signal lines 557, and/or the optoelectronic components 514.

Figure 3A:
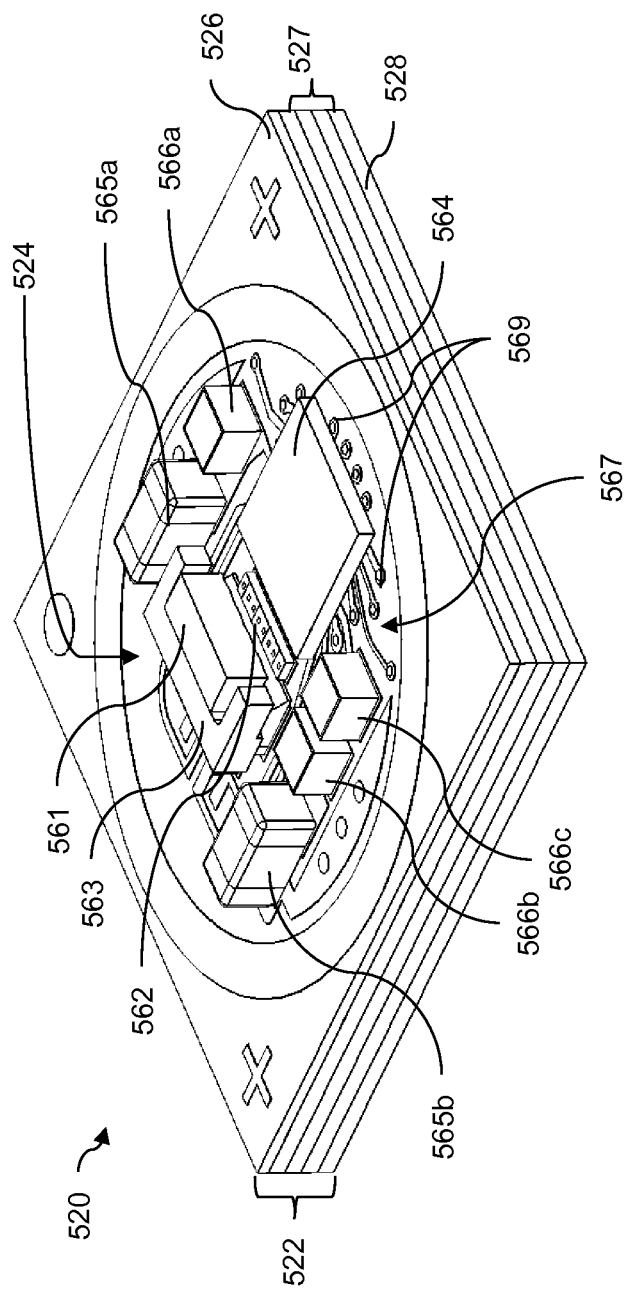
FIG. 3A is a perspective view of an embodiment of a header subassembly.
Figure 3B:
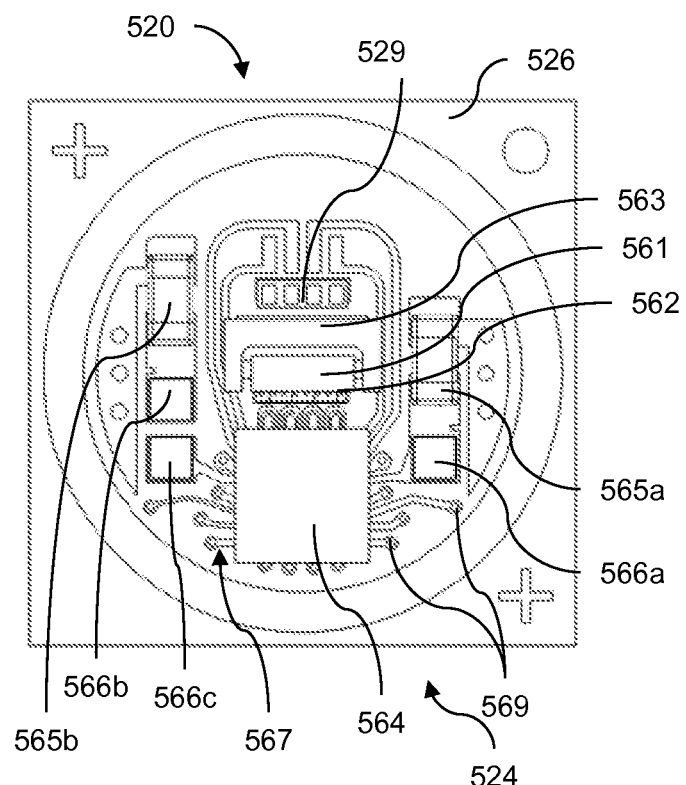
FIG. 3B is a top view of the header subassembly of FIG. 3A.
Figure 3C:
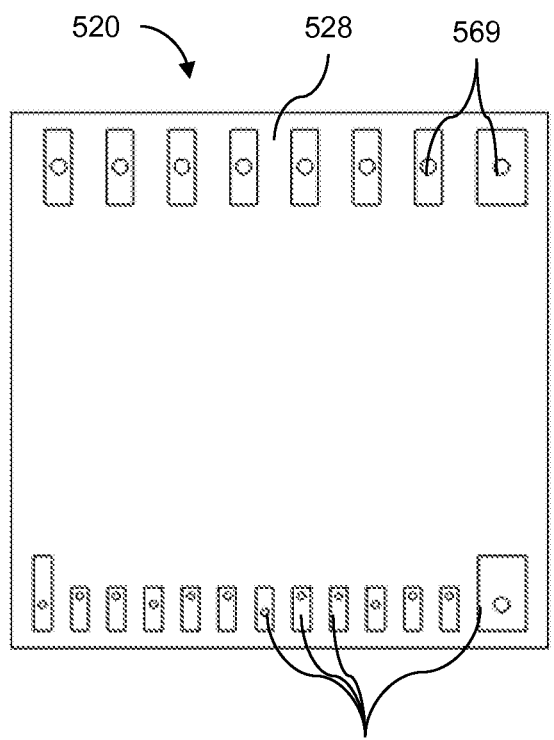
FIG. 3C is a bottom view of the header subassembly of FIG. 3A.

With reference to FIGS. 3A-3C, the TOSA header 520 will be described in further detail. The TOSA header 520 may include a substrate 522 and optoelectronic components 524 coupled to or formed on the substrate 522. In some configurations, the substrate 522 may be a multi-layer substrate with intermediate layers 527 positioned between a top layer 526 and a bottom layer 528.

The optoelectronic components 524 may include any suitable components that may be used in TOSAs and/or other optoelectronic subassemblies. More specifically, the optoelectronic components 524 may include electrical components (e.g., integrated circuits, drivers, amplifiers, capacitors, inductors, control circuits, and/or others), optical components (e.g., lenses, prisms, mirrors, filters, and/or others), one or more optical transmitters (e.g., lasers, laser array, laser diodes, light-emitting diodes, and/or others) and/or one or more receivers (e.g., monitor photodioted "MPD," MPD arrays and/or others). The optoelectronic components 524 may be configured to convert electrical signals to optical signals and thus may be optoelectronic transducers. Additionally or alternatively, the optoelectronic components 524 may be configured to transmit optical signals to a fiber optic networks via the optical cables 301a and/or 301b.

As illustrated, in some configurations the optoelectronic components 524 may include a laser array 562, an MPD array 529 (FIG. 3B) an integrated circuit 564, electrical components 565a-b, electrical components 566a-c, an optical component 561, and/or component coupling 563. The electrical components 565a-b may be integrated circuits, control circuits, drivers, amplifiers, inductors, capacitors and/or other suitable optoelectronic components. The electrical components 566a-c may be integrated circuits, control circuits, drivers, amplifiers, inductors, capacitors and/or other suitable optoelectronic components. In some configurations, electrical components such as electrical components 565a-b, 566a-c and/or the integrated circuit 564 may be positioned on the bottom layer 528. Some or all of the electrical components 565a-b, 566a-c may include capacitors to filter direct current voltage supplied to circuitry.

The laser array 562 may be configured to receive electrical signals and convert the electrical signals to corresponding optical signals and/or transmitting optical signals to fiber optic networks. In some configurations, the laser array 562 includes a plurality of lasers, each capable of transmitting sets of optical signals corresponding to one channel. The MPD array 529 may be configured to receive a portion of the optical signals from the laser array 562 to facilitate monitoring of the characteristics of the optical signals emitted. In some configurations, the optical component 561 may be capable of directing a portion of the optical signals from the laser array 562 to the MPD array 529. In such configurations, the optical component 561 may be configured to direct optical signals not directed to the MPD array 529 to a fiber optic network via the optical cables 301a-b. The optical signals received by the MPD array 529 may be used in a feedback control system to adjust the output of the laser array 562. The electrical components 565a-b and/or electrical components 566a-c may be part of the feedback control system and may be coupled to the MPD array 529.

The optical component 561 may include lenses, prisms, mirrors, filters, and/or other suitable features. The optical component 561 may be configured to convey, transmit, collimate and/or focus optical signals emitted by the laser array 562. The component coupling 563 may mechanically and/or electrically couple any of the optoelectronic components 524 to the substrate 522. In some configurations, the component coupling 563 may mechanically couple the optical component 561 to the substrate 522. In such configurations, the component coupling 563 may retain the optical component 561 optically aligned and/or coupled with the laser array 562 and/or the MPD array 529. In some configurations, the component coupling 563 may be a lens holder. The component coupling 563 may facilitate optical alignment or adjustment of optical alignment of the optical component 561.

Some or all of the optoelectronic components 524 may be electrically or optically coupled to one another. For example, the optoelectronic components 524 may be electrically coupled to one another by signal lines 567, contact pads 568, vias 569, wire bonds, or other suitable interconnections. In some configurations, the intermediate layers 527 may include thick film traces of conductive material formed by thick film metallization.

Signal lines 567 may be positioned on the top layer 526 and may be formed of electrically conductive material to couple at least some of the optoelectronic components 524. The signal lines 567 may be thick film signal lines 567 formed by thick film metallization if the length of the signal lines 567 is substantially or relatively short. Contact pads 568 may be positioned on the bottom layer 528 and may be formed of electrically conductive material to permit electrical power and/or control signals to be transmitted to the TOSA header 520 and/or the optoelectronic components 524. The contact pads 568 may be capable of engaging flex circuits, printed circuit boards ("PCBs"), other connectors and/or electronic assemblies. The contact pads 568 may be thick film contact pads 568 formed by thick film metallization or thin film contact pads 568 formed by thin film metallization.

Figure 8A:
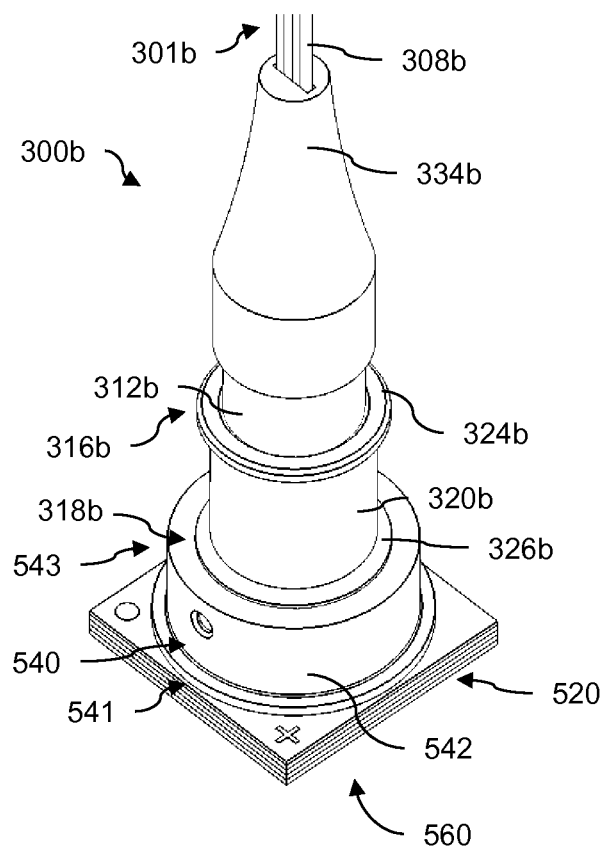
FIG. 8A is a perspective view of an embodiment of an optoelectronic subassembly.
Figure 8B:
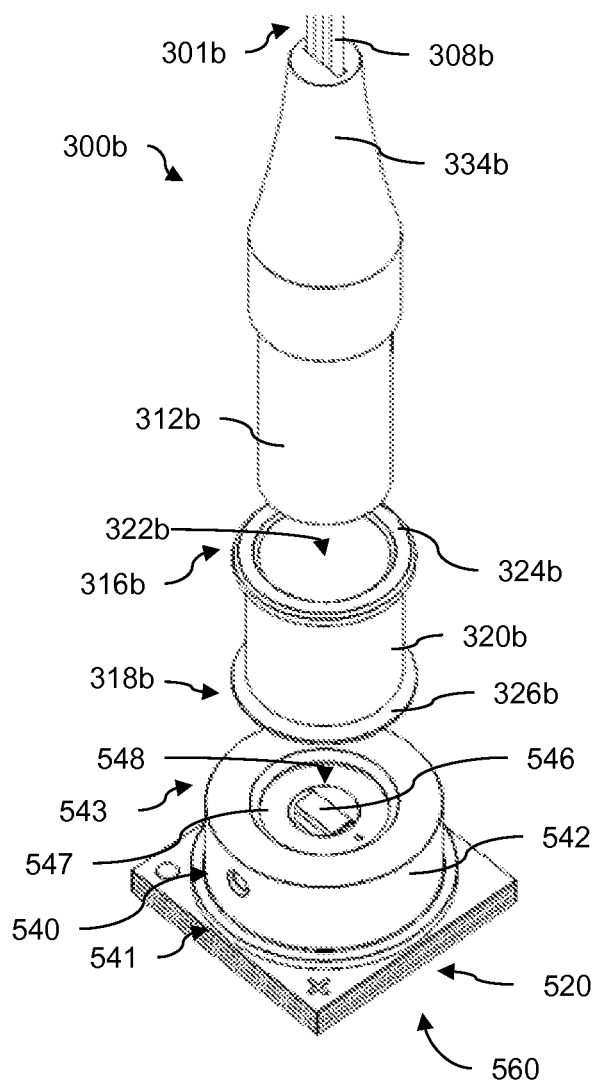
FIG. 8B is an exploded perspective view of the optoelectronic subassembly of FIG. 8A.
Figure 8C:
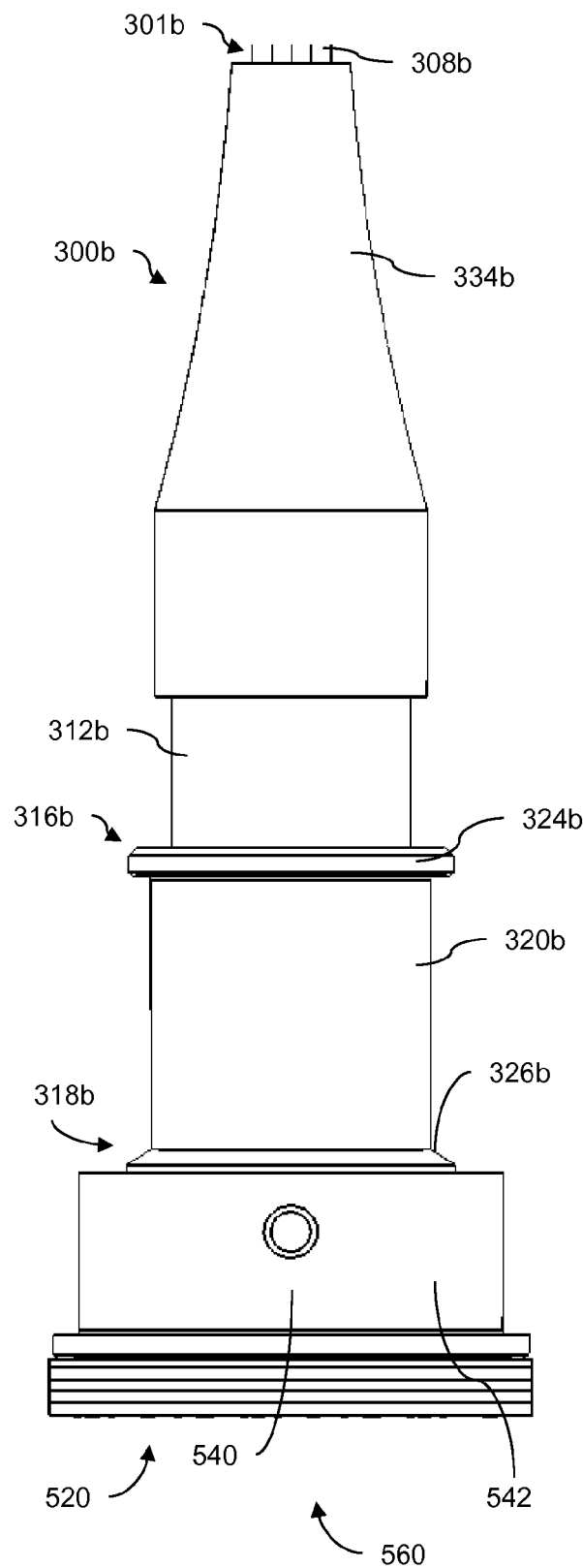
FIG. 8C is a side view of the optoelectronic subassembly of FIG. 8A.
Figure 8D:
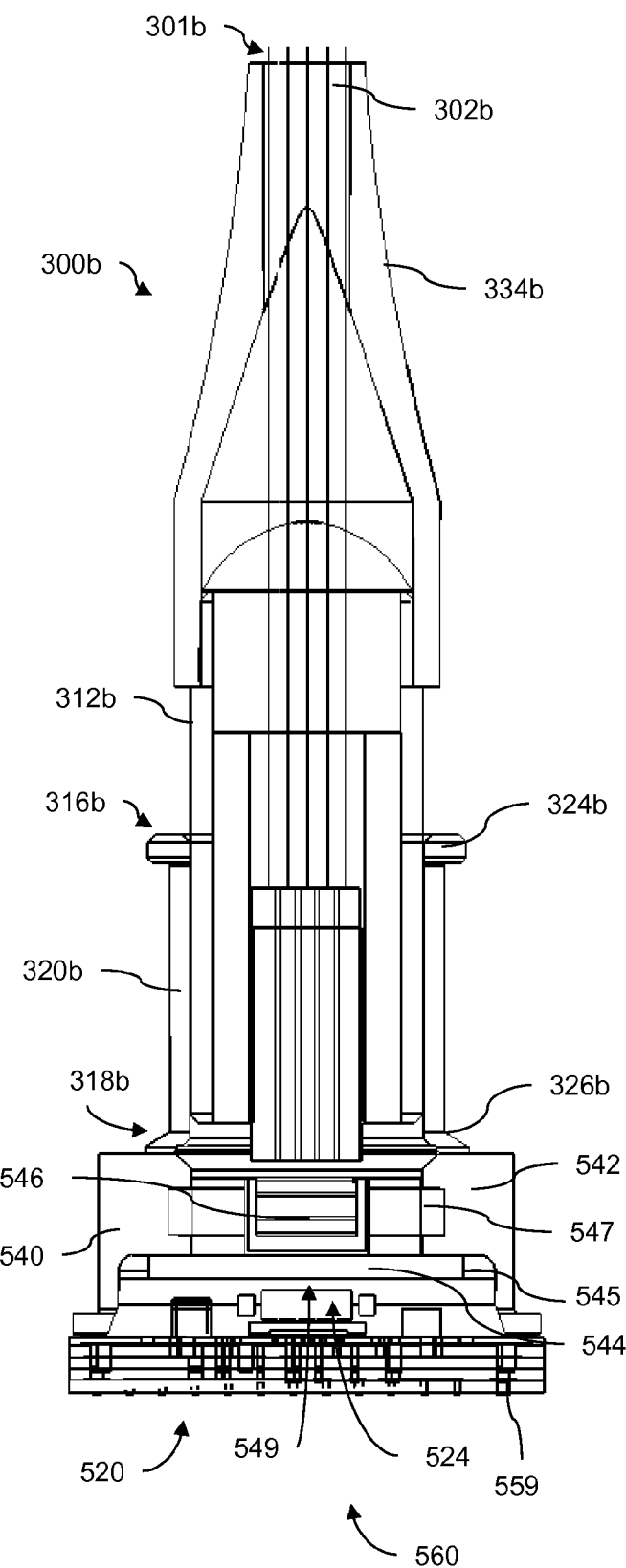
FIG. 8D is a side cross section of the optoelectronic subassembly of FIG. 8A.

The vias 569 of conductive material (only some of which are labeled in the Figures for clarity) may extend through a portion of the substrate 522. For example, one or more of the vias 569 may extend through one or more of: the bottom layer 528, at least one of the intermediate layers 527, and/or the top layer 526 (see for example FIG. 8D). Some of the vias 569 may be electrically coupled to the contact pads 568, the signal lines 567, and/or the optoelectronic components 524. The vias 569 may permit power and/or control signals to travel between the contact pads 568, the signal lines 567, and/or the optoelectronic components 524.

In some optoelectronic assemblies, electronic and/or radio frequency signal transmission lines ("RF lines") may couple lasers or other components of optoelectronic assemblies. The electrical performance of the RF lines ("RF performance" or "RF response") may be important to the operation optoelectronic assemblies. Accurately controlling and/or reducing the dimensions of RF lines may contribute to optoelectronic assemblies with suitable and/or favorable RF performance. However, the design and positioning of components of optoelectronic assemblies may prevent the length RF lines from being sufficiently controlled and/or minimized. The electrical performance of the RF lines may be particularly important for relatively high frequency optoelectronic assemblies, such as those that operate at 1, 2, 4, 10, 30 gigabits per second (Gb/s) or higher. In some configurations, some of the optoelectronic components 514 and/or 524 may be coupled to one another with RF lines. The contact pads 558, the signal lines 557 and/or the vias 559 of the ROSA header 510 may be RF lines and/or the contact pads 568, the signal lines 567 and/or the vias 569 of the TOSA header 520 may be RF lines.

The ROSA header 510 and/or the TOSA header 520 may include any suitable aspects of U.S. Provisional Application 62/069,710 filed Oct. 28, 2014, entitled MULTI-LAYER SUBSTRATES and/or U.S. Provisional Application 62/069,712 filed Oct. 28, 2014, entitled SUBSTRATES INCLUDING OPTOELECTRONIC COMPONENTS, which are both hereby incorporated by reference in their entirety. Furthermore, the optoelectronic assembly 500 may include any suitable aspects described in the above-referenced applications.

In some configurations, the TOSA 560 and/or the ROSA 550 may include hermetically sealed housings such as ROSA housing 530 and/or TOSA housing 540 to protect components. However, space within hermetically sealed housings may be limited, especially if the optoelectronic assemblies comply with small form factor industry standards. Furthermore, increasing the size of hermetically sealed housings may increase the costs of producing optoelectronic assemblies. Conversely, decreasing the size of hermetically sealed housings may decrease the costs of producing optoelectronic assemblies.

Producing some hermetically sealing structures may increase the production costs of optoelectronic assemblies. In some circumstances, producing hermetically sealing structures with greater hermetically sealed portions may be more expensive than producing hermetically sealing structures with smaller hermetically sealed portions. Some hermetic sealing structures may add to the complexity of optoelectronic assemblies. Additionally or alternatively, some hermetic sealing structures may increase the size of optoelectronic assemblies.

Figure 4A:
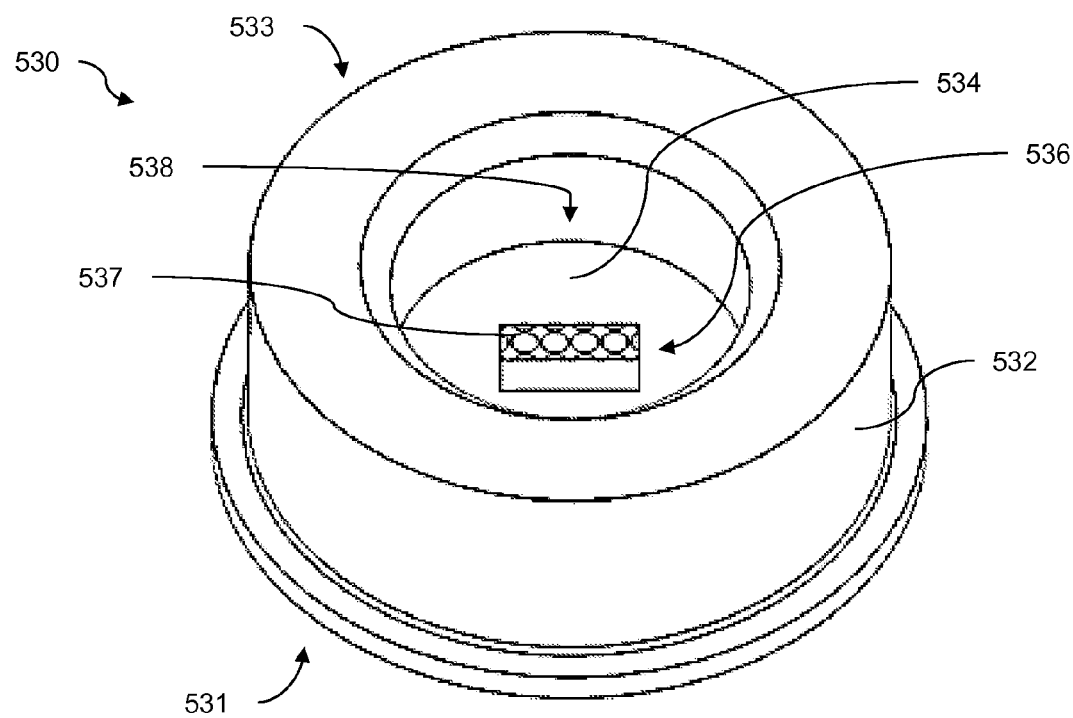
FIG. 4A is a perspective view of an embodiment of a housing.
Figure 4B:
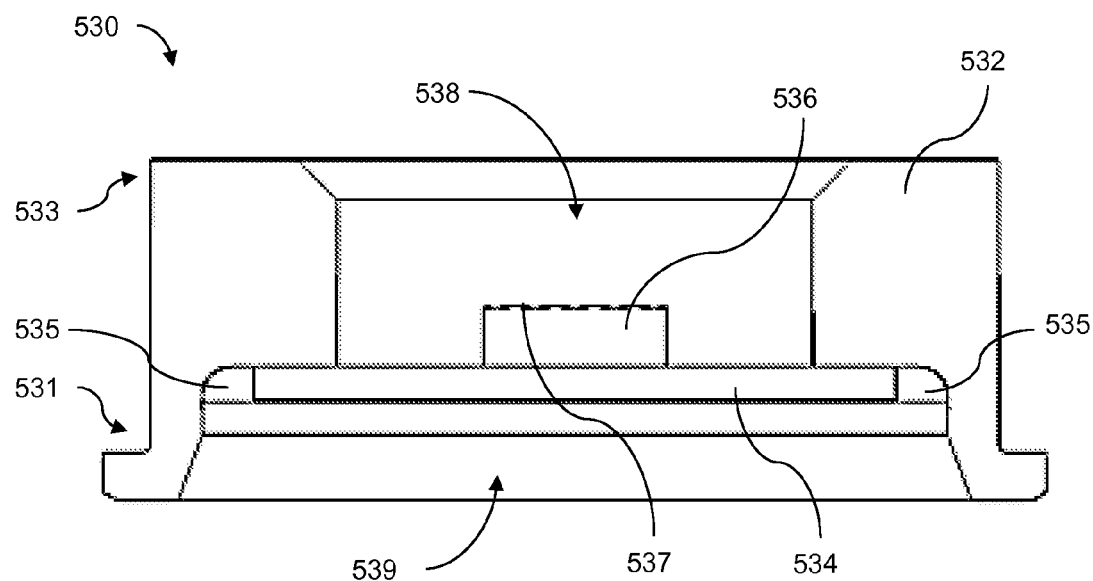
FIG. 4B is a side cross section of the housing of FIG. 4A.

With reference to FIGS. 4A-4B, the ROSA housing 530 will be described in further detail. The ROSA housing 530 can include a housing body 532 extending between a housing top 533 and a housing bottom 531. The ROSA housing 530 may include a window 534 at least partially surrounded by the housing body 532. The window 534 may be optically transmissive and may be integral with or coupled to the housing body 532. A lens array 536 including a plurality of lenses 537 (only one of which is labeled in the Figures for clarity) may be positioned on the window 534. The lens array 536 may be configured to convey, direct, collimate and/or focus optical signals travelling between the optical cables 301a and the receiver array 552. Each of the lenses 537 may be configured (e.g., shaped, dimensioned and/or positioned) to convey, direct, collimate and/or focus optical signals corresponding to one channel.

The ROSA housing 530 may define a housing cavity 539 at the housing bottom 531. The housing cavity 539 may at least partially enclose the optoelectronic components 514 when the ROSA housing 530 is coupled to the ROSA header 510. The ROSA housing 530 may include an aperture 538 beginning at the housing top 533 and extending through at least a portion of the housing body 532. The aperture 538 may be configured (e.g., shaped and/or dimensioned) to permit optical signals to travel through at least a portion of the ROSA housing 530 to the window 534. In some configurations, the aperture 538 may receive and/or house the lens array 536 within the aperture 538. Additionally or alternatively, the aperture 538 may receive and/or house other optical components within the aperture 538.

As illustrated, the lens array 536 may include a rectangular array body coupled to or formed on the window 534 within the aperture 538. Each of the lenses 537 may include one or more optically transmissive surfaces configured to convey, direct, collimate and/or focus optical signals. The optically transmissive surfaces may be planar or curved surfaces (e.g., concave, or convex). In some circumstances, the lenses 537 may be convex and the convex configuration of the lenses 537 may optimally convey, direct, collimate and/or focus optical signals. The lenses 537 may be coupled to, integral with, or formed with the array body. In some configurations, the lenses 537 may be positioned on the top and/or the bottom of the array body. Additionally or alternatively, in some configurations the lenses 537 may be positioned within the array body.

As illustrated for example in FIG. 4B, a window seal 535 may be positioned between the housing body 532 and the window 534. In some configurations, the window seal 535 may couple the housing body 532 to the window 534 (or vice versa). Additionally or alternatively, the window seal 535 may contribute to providing a hermetic seal between the housing body 532 and the window 534. In some configurations, the housing cavity 539 may hermetically seal portions of header subassemblies such as the ROSA header 510 when coupled to the ROSA header 510 and thus may be a hermetically sealed housing cavity 539.

In other configurations of the ROSA housing 530 (see for example FIGS. 6A-B and associated descriptions), the lens array 536 may not be positioned within the aperture 538. For example, in some configurations the lens array 536 may be positioned on the other side of the window 534 within the housing cavity 539. In other configurations, the lens array 536 may not include a rectangular array body. For example, the lens array 536 may include a circular array body configuration or the array body may be omitted and the lenses 537 may be coupled directly to the window 534. Additionally or alternatively, the lens array 536 may include other optical components such as lenses, prisms, mirrors, filters, isolators, and/or other suitable features.

Figure 5A:
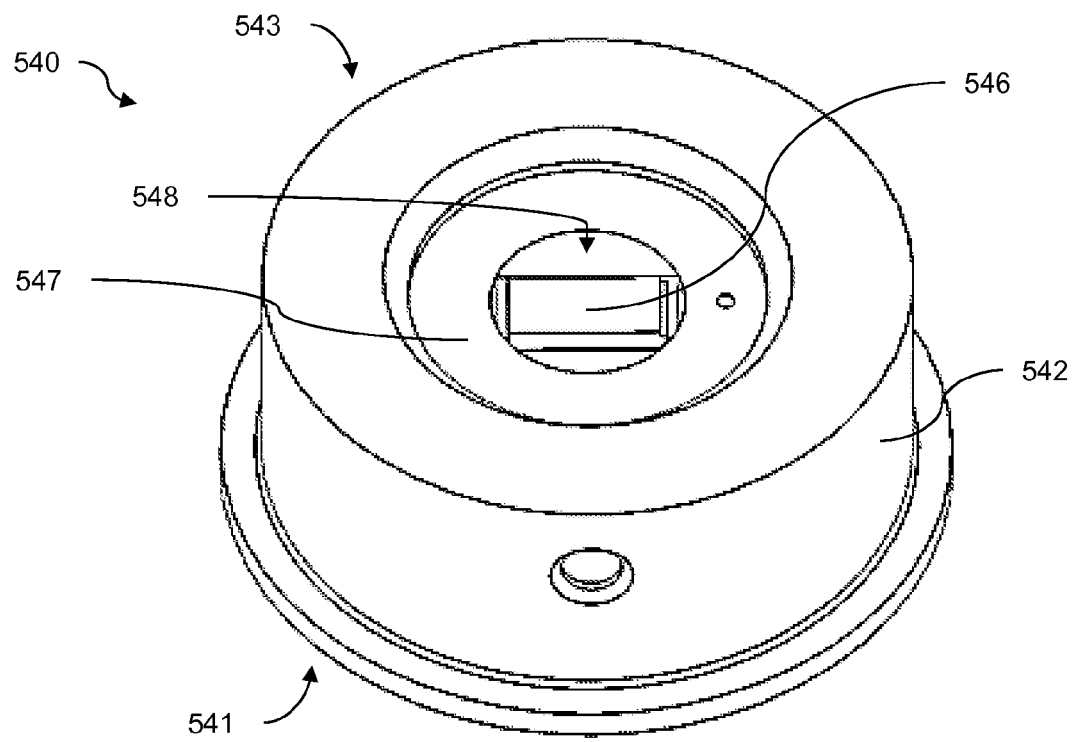
FIG. 5A is a perspective view of an embodiment of a housing.
Figure 5B:
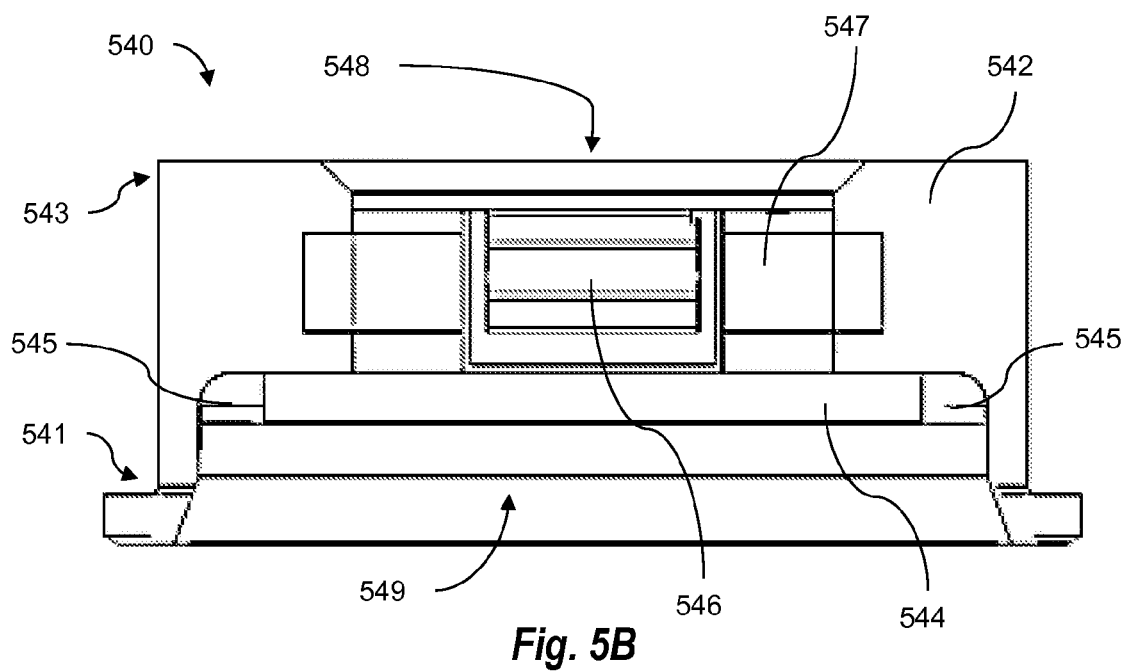
FIG. 5B is a side cross section of the housing of FIG. 5A.

With reference to FIGS. 5A-B, the TOSA housing 540 will be described in further detail. The TOSA housing 540 can include a housing body 542 extending between a housing top 543 and a housing bottom 541. The TOSA housing 540 may include a window 544 at least partially surrounded by the housing body 542. The window 544 may be optically transmissive and may be integral with or coupled to the housing body 542.

The TOSA housing 540 may define a housing cavity 549 at the housing bottom 541. The housing cavity 549 may at least partially enclose the optoelectronic components 514 when the TOSA housing 540 is coupled to the TOSA header 520. The TOSA housing 540 may include an aperture 548 beginning at the housing top 543 and extending through at least a portion of the housing body 542. The aperture 548 may be configured (e.g., shaped and/or dimensioned) to permit optical signals to travel through at least a portion of the TOSA housing 540 to the window 544.

An optical component 546 may be positioned within the aperture 548 and/or may be retained by coupling assembly 547. The optical component 546 may include one or more isolators, lenses, prisms, mirrors, filters, and/or other suitable optical features. The optical component 546 may be configured to convey, direct, collimate and/or focus optical signals travelling between the laser array 562 and the optical cables 301b and. In some configurations, the optical component 546 may include any suitable aspects described with respect to the lens array 536.

In some configurations, the aperture 548 may receive and/or house the optical component 546 within the aperture 548. The coupling assembly 547 may be configured to retain the optical component 546 with respect to the housing body 542 and/or facilitate optical alignment of the optical component 546. In some configurations, the coupling assembly 547 may include an adhesive or potting material that is injected into the aperture 548 and at least partially surrounding the optical component 546, the adhesive or potting material retaining the optical component 546 after it settles. In other configurations, the coupling assembly 547 may include any suitable coupling or fastening features to couple the optical component 546 to the housing body 542.

As illustrated for example in FIG. 5B, a window seal 545 may be positioned between the housing body 542 and the window 544. In some configurations, the window seal 545 may couple the housing body 542 to the window 544 (or vice versa). Additionally or alternatively, the window seal 545 may contribute to providing a hermetic seal between the housing body 542 and the window 544. In some configurations, the housing cavity 549 may hermetically seal portions of header subassemblies such as the TOSA header 520 when coupled to the TOSA header 520 and thus may be a hermetically sealed housing cavity 549.

In other configurations of the TOSA housing 540 (see for example FIGS. 6A-B and associated descriptions), the optical component 546 may not be positioned within the aperture 548. For example, in some configurations the optical component 546 may be positioned on the other side of the window 544 within the housing cavity 549.

Figure 6A:
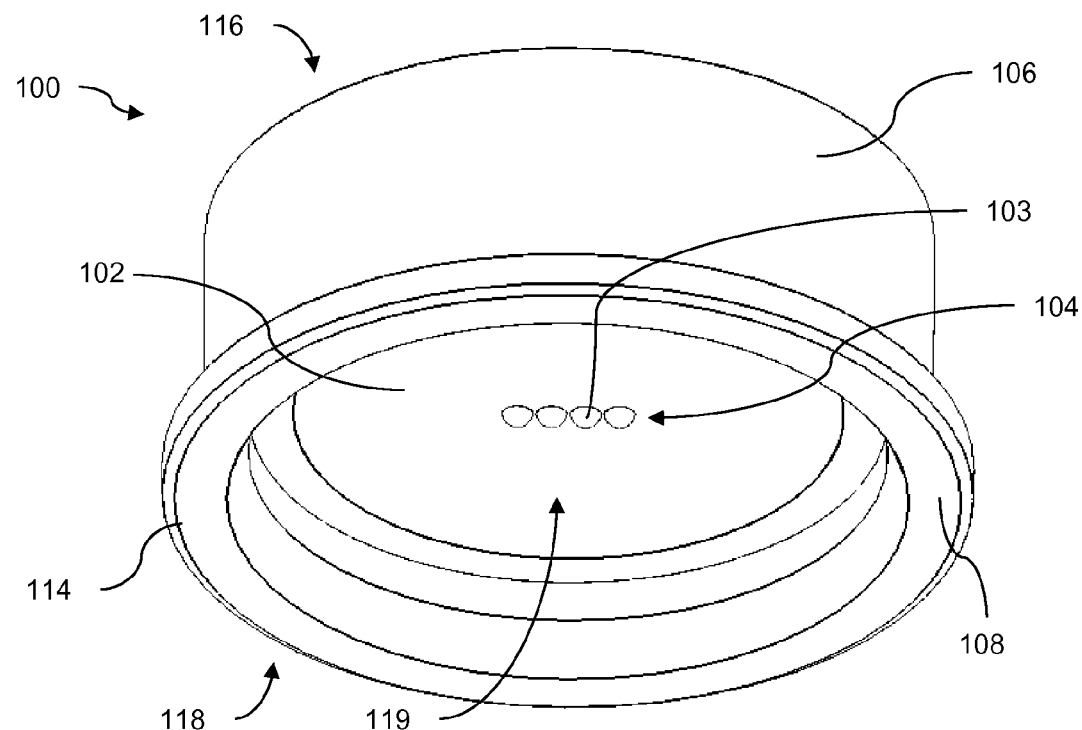
FIG. 6A is a perspective view of an embodiment of a housing.
Figure 6B:
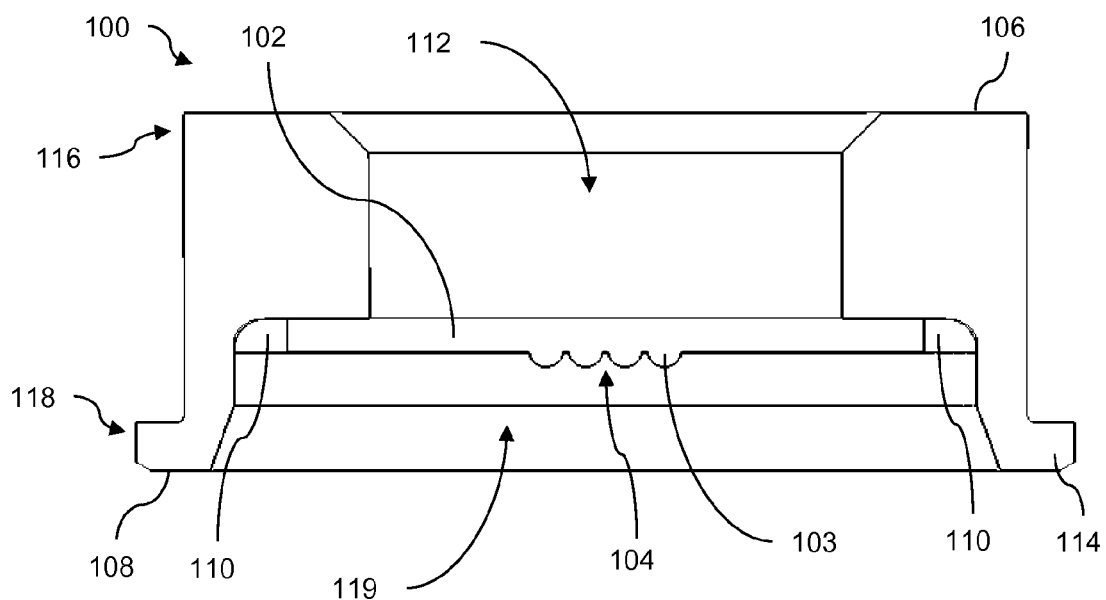
FIG. 6B is a side cross section of the housing of FIG. 6A.

With reference to FIGS. 6A-B, an alternative housing will be described in further detail. In some configurations, the alternative housing may be an optical component 100 and/or a multi-lens optical component 100. The ROSA housing 530 and/or the TOSA housing 540 may include any or all suitable aspects described with respect to the housing 100. The optical component 100, the ROSA housing 530 and/or the TOSA housing 540 may include any suitable aspects of U.S. patent application Ser. No. 14/881,693, filed Oct. 13, 2015, entitled MULTI-LENS OPTICAL COMPONENTS and U.S. Provisional Application 62/063,225, filed Oct. 13, 2014, entitled MULTI-LENS OPTICAL COMPONENTS, which are both hereby incorporated by reference in their entirety. Additionally or alternatively, the optoelectronic assembly 500 may include any suitable aspects described in the above-referenced applications.

The housing 100 can include a housing body 106 extending between a housing top 116 and a housing bottom 118. The housing 100 may include a window 102 with a lens array 104 of lenses 103 (only one of which is labeled in the Figures for clarity). Each lens 103 may be configured to convey, direct, collimate and/or focus light signals travelling between optoelectronic components such as the ROSA header 510, the TOSA header 520, the optical cables 301a-b, and/or the ferrule assemblies 300a-b. Each lens 103 may be configured to convey, direct, collimate and/or focus light signals corresponding to one channel.

The housing 100 may include a window seal 110 that contributes to providing a hermetic seal between the housing body 106 and the window 102. The housing body 106, the window 102 and/or the window seal 110 may define a housing cavity 119. In some configurations, the housing cavity 119 may hermetically seal portions of the ROSA header 510 and/or the TOSA header 520 when coupled to the ROSA header 510 and/or the TOSA header 520 and thus may be referred to as a hermetically sealed housing cavity 119.

The housing 100 may include an aperture 112 defined by the housing body 106 and/or the window 102. The aperture 112 may be configured (e.g., shaped and/or dimensioned) to permit light signals to travel through at least a portion of the housing 100 to the window 102. In some configurations, the aperture 112 may receive or house at least a portion of additional optical components within the aperture 112. For example, the aperture 112 may receive an optical component such as the optical component 546 (FIGS. 5A-B) or the lens array 536 (FIGS. 4A-B).

The window 102 may be optically transmissive and may be integral to the housing body 106 or coupled to the housing body 106. The lens array 104 may be positioned on the window 102, at or near the housing bottom 118 and/or within the housing cavity 119. The lenses 103 of the housing 100 may be optically transmissive convex surfaces configured to convey, direct, collimate and/or focus optical signals. The lenses 103 may be coupled with or integral to the window 102. All or some of the lenses 103 may be configured (e.g., shaped, dimensioned and/or positioned) to convey, direct, collimate and/or focus optical signals corresponding to one channel of a multi-channel subassembly, such as the ROSA header 510 and/or the TOSA header 520.

The housing 100 may include a flange 114 positioned on the housing bottom 118. The flange 114 may include a flange base 108 that may be configured (shaped and/or dimensioned) such that the housing 100 may be coupled to other components, such as header assemblies such as the ROSA header 510 and/or the TOSA header 520. The housing top 116 may be configured (shaped and/or dimensioned) to interface with ferrule assemblies such as ferrule assemblies 300a-b.

As illustrated, the housing body 106 may be substantially circular or annular, although the housing body 106 may be any suitable configurations including rectangular, oval, multifaceted and other configurations. The window seal 110 may be substantially annular and positioned between the window 102 and the housing body 106. In other configurations, the window seal 110 may not be annular. For example, in configurations where the housing body 106 is rectangular, the window seal 110 may also include a corresponding rectangular configuration.

In addition to or instead of contributing to providing a hermetic seal, the window seal 110 may contribute to coupling the window 102 to the housing body 106. For example, for configurations where a hermetic seal is not desired or required, the window seal 110 may couple the window 102 to the housing body 106 and may not contribute to providing a hermetic seal. In other configurations, the window seal 110 may both contribute in coupling the window 102 to the housing body 106 as well as contribute to providing a hermetic seal.

Certain aspects of the ROSA housing 530, the TOSA housing 540 and/or the housing 100 may facilitate economical production of the optoelectronic assembly 500. Aspects may contribute to decreased production costs for the optoelectronic assembly 500. For example, some aspects may simplify the production processes of the optoelectronic assembly 500. In another example, some aspects may decrease the costs of the materials used to produce the ROSA housing 530, the TOSA housing 540 and/or the optoelectronic assembly 500. In yet another example, some aspects may decrease the necessary size of the hermetically sealed portions of the optoelectronic assembly 500. Additionally or alternatively, aspects may decrease the size or clearance of the optoelectronic assembly 500.

Figure 7A:
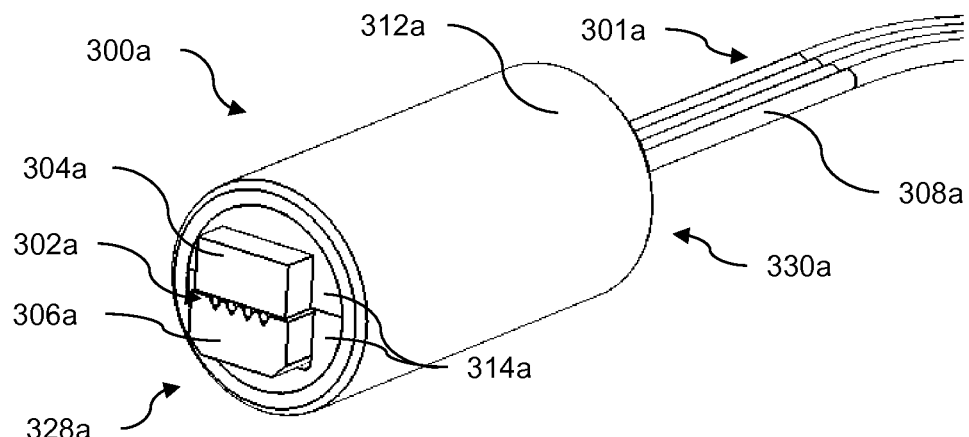
FIG. 7A is a perspective view of an embodiment of a portion of a ferrule assembly.
Figure 7B:
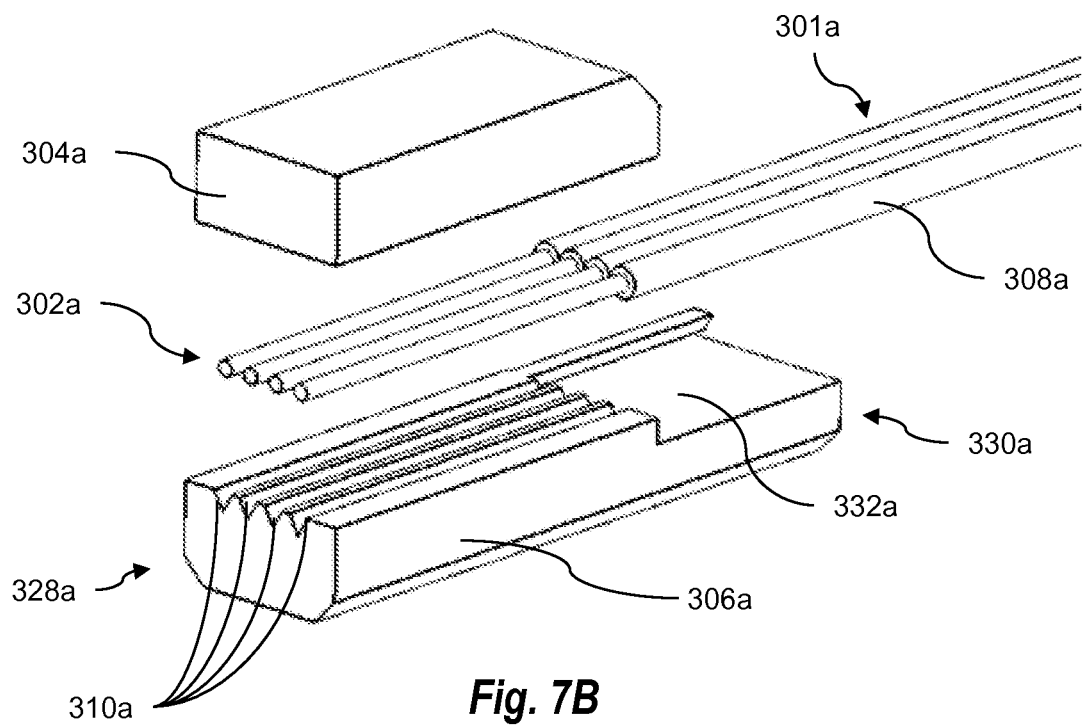
FIG. 7B is an exploded perspective view of an embodiment of a portion of the ferrule assembly of FIG. 7A.
Figure 7C:
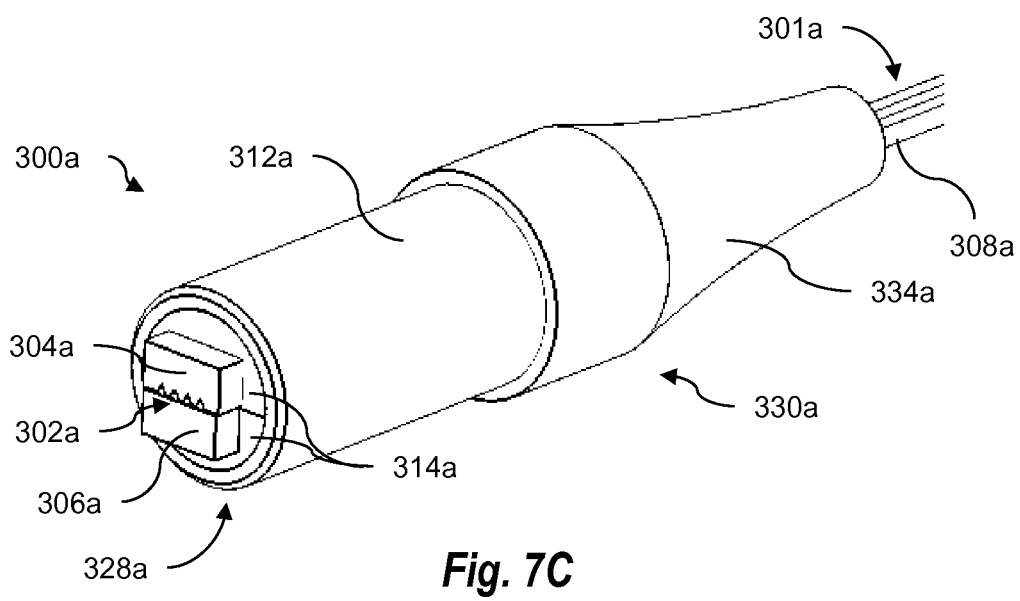
FIG. 7C is a perspective view of an embodiment of a portion of a ferrule assembly.

With reference to FIGS. 7A-C, the ferrule assembly 300a will be described in further detail. The ferrule assembly 300a may be configured to couple multiple optical fibers 302a in optoelectronic subassemblies such as the ROSA 550 (see for example FIGS. 1A-1B). Each optical fiber 302a may correspond to one channel of the multi-channel optoelectronic assembly 500. The optical cables 301a can include casings 308a surrounding at least a portion of the optical fibers 302a. The casing 308a can be configured to insulate and/or guard the optical fibers 302a. As illustrated, at least one or all of the optical fibers 302a can include a corresponding one of the casings 308a.

The ferrule assembly 300a can include an upper portion such as an upper clamp member 304a configured to couple with optical fibers 302a and a lower portion such as a lower clamp member 306a configured to couple with the optical fibers 302a and the upper clamp member 304a. The upper and lower clamp members 304a, 306a may be configured to retain optical fibers 302a of corresponding optical cables 301a (which may be a single optical cable or a plurality of optical cables, such as ribbon optical cables) positioned between the upper and lower clamp members 304a, 306a. Accordingly, the upper and lower clamp members 304a, 306a may cooperate to couple the optical fibers 302a between one another. In some aspects, the upper and lower clamp members 304a, 306a may form a single integrally formed clamp member.

A ferrule body 312a may surround at least a portion of the optical fibers 302a. In some configurations, the ferrule body 312a may be annular or cylindrical. The ferrule body 312a can be configured to hold the upper and lower clamp members 304a, 306a together to clamp the optical fibers 302a between the upper and lower clamp members 304a, 306a. A potting material 314a may be positioned within the ferrule body 312a and around the upper and lower clamp members 304a, 306a so that the potting material 314a fills gaps between the ferrule body 312a and the upper and lower clamp members 304a, 306a to hold the ferrule assembly 300a together and retain the optical fibers 302a clamped between the upper and lower clamp members 304a, 306a within the ferrule body 312a. In some aspects, all of the ferrule body 312a, the upper and lower clamp members 304a, 306a and the potting material 314a can contribute to holding the ferrule assembly 300a together and/or retaining the optical fibers 302a.

The potting material 314a can be a single material or formed from two separate materials, with one material for the bottom and one material for the top. In some configurations, the potting material 314a may be a portion of or integrated with the ferrule body 312a. In some configurations, the potting material 314a may be part of the upper and lower clamp members 304a, 306a, such that they have a round cross-sectional profile once clamped together to fit (e.g., friction fit) in the round lumen of the ferrule body 312a.

As illustrated, in some configurations the ferrule body 312a may be annular or cylindrical. In other configurations, the ferrule body 312a may be any suitable configuration including rectangular, multi-faceted, curved or a combination thereof. The potting material 314a and upper and lower clamp members 304a, 306a may also have various shapes that can fit within the ferrule body 312a. Accordingly, the shapes and dimensions of the elements of the ferrule assembly 300a can be varied.

The lower clamp member 306a may include troughs 310a. Each of the troughs 310a may be configured (e.g., shaped and/or dimensioned) to receive or house a portion of a corresponding optical fiber 302a. The troughs 310a can include any suitable configuration, including v-shaped, u-shaped, c-shaped, semi-circular, square, tapered or any other shape. The troughs 310a may be longitudinally oriented and extend from a front end 328a toward a back end 330a. As illustrated, the troughs 310a may terminate at a shelf 332a of the lower clamp member 306a at the back end 330a. Correspondingly, the upper clamp member 304a may be dimensioned to extend over the troughs 310a from the front end 328a to the shelf 332a or the back end 330a. In other examples, the shelf 332a may not be included and the troughs 310a make extend the entire length the upper clamp member 304a and/or lower clamp member 306a. The troughs 310a may be on the upper clamp member 304a and/or lower clamp member 306a.

As illustrated for example in FIG. 7C, the ferrule assembly 300a may include a boot 334a surrounding a portion of the optical cables 301a and/or the ferrule body 312a. The boot 334a may contribute to supporting and/or retaining the optical cables 301a. Additionally or alternatively, the boot 334a may contribute to holding the ferrule assembly 300a together.

The ferrule assembly 300a may be configured to retain the optical fibers 302a in a linear configuration, as illustrated, where at least a portion of the optical fibers 302a share a common plane, and may be parallel (e.g., troughs 310a may be parallel). Additionally or alternatively, the optical fibers 302a may be arranged in any suitable configuration such as square, rectangular, circular or any other configuration. The configuration of the optical fibers 302a of the ferrule assembly 300a may correspond to the configuration of the lens array 536, the optical component 546, the lens array 104, the ROSA header 510 and/or the TOSA header 520.

Turning to FIGS. 8A-8D, the TOSA 560 and the ferrule assembly 300b will be described in further detail. The ferrule assembly 300b may include any or all suitable aspects described with respect to the ferrule assembly 300a, with like numbers referring to like elements of the ferrule assembly 300b. Additionally or alternatively, the ferrule assemblies 300a-b may include any suitable aspects of patent application Ser. No. 14/824,883, filed Aug. 12, 2015, entitled FERRULE ASSEMBLIES, and Provisional Application 62/036,714, filed Aug. 13, 2014, entitled FERRULE ASSEMBLIES, which are both hereby incorporated by reference in their entirety. Aspects of "Ferrule Assemblies" may be incorporated in the ferrule assemblies 300a-b and/or the configurations of the optoelectronic assembly 500.

The ferrule assembly 300b may be configured to couple multiple optical fibers 302b in optoelectronic subassemblies such as the TOSA 560 (see for example FIGS. 1A-1B). Each optical fiber 302b may correspond to one channel of the multi-channel optoelectronic assembly 500. As described with respect to the optical cables 301a, each of the optical cables 301b may include optical fibers 302b surrounded by casings 308b. The optical cables 301b may be retained at least partially within a ferrule body 312b by an upper clamp member like upper clamp member 304a, a lower clamp member like lower clamp member 306a (which may include troughs and/or a shelf), and/or potting material (not illustrated).

The ferrule assembly 300b may include a boot 334b surrounding a portion of the optical cables 301b and/or the ferrule body 312b. The boot 334b may contribute to supporting and/or retaining the optical cables 301b. Additionally or alternatively, the boot 334b may contribute to holding the ferrule assembly 300b together.

The ferrule assembly 300b may include an alignment sleeve 320b configured to facilitate alignment of the ferrule assembly 300b. The alignment sleeve 320b may include a cylindrical body extending between a sleeve top 316b and a sleeve bottom 318b and defining a sleeve cavity 322b. The sleeve cavity 322b may include a configuration (e.g., shape and/or dimension) corresponding to the ferrule body 312b to receive the ferrule body 312b.

The alignment sleeve 320b may include an upper sleeve flange 324b positioned on the sleeve top 316b and/or a lower sleeve flange 326b positioned on the sleeve bottom 318b. The sleeve bottom 318b of the alignment sleeve 220b may be configured (e.g., shaped and/or dimensioned) to interface with the TOSA housing 540. The lower sleeve flange 326b and/or the sleeve bottom 318b may be positioned against the housing top 543 thereby preventing the alignment sleeve 320b from being inserted into the aperture 548. In such configurations, a portion of the ferrule assembly 300b may be positioned in the aperture 548.

If the ferrule body 312b is cylindrical, as illustrated, the sleeve cavity 322b may include a diameter corresponding to a diameter of the ferrule body 312b so the ferrule body 312b may be positioned at least partially inside of the alignment sleeve 320b. For example, the diameter of the sleeve cavity 322b may be about the same or slightly greater than the diameter of the ferrule body 312b. Such configurations may permit the ferrule assembly 300b to be repositioned in a longitudinal and/or rotational direction along a longitudinal axis with respect to the alignment sleeve 320b. "The longitudinal direction" may refer to movement in either direction along the longitudinal axis or both directions along the longitudinal axis.

Repositioning the ferrule assembly 300b along the longitudinal axis may permit the optical fibers 302b to be optically aligned with the TOSA housing 540 and/or the TOSA header 520. This configuration may also limit the range of motion of the ferrule assembly 300b such that it may not be repositioned along axes transverse to the longitudinal axis with respect to the alignment sleeve 320b. Limiting the range of motion of the ferrule assembly 300b along the transverse axes may facilitate its alignment. For example, limiting the range of motion may simplify and/or decrease the costs of aligning the ferrule assembly 300b with the TOSA housing 540 and/or the TOSA header 520. Once the longitudinal alignment is obtained, the ferrule body 312b can be fixed in a set position at a longitudinal position. Then the optical fibers 302b are in a set longitudinal position relative to the laser array 562 and/or other components. Setting the longitudinal position then allows for rotational alignment or alignment in directions transverse to the longitudinal axis of the optical fibers 302b with the laser array 562 and/or other components without changing the longitudinal position, which significantly improves the ease and repeatability of fiber alignment.

Figure 9A:
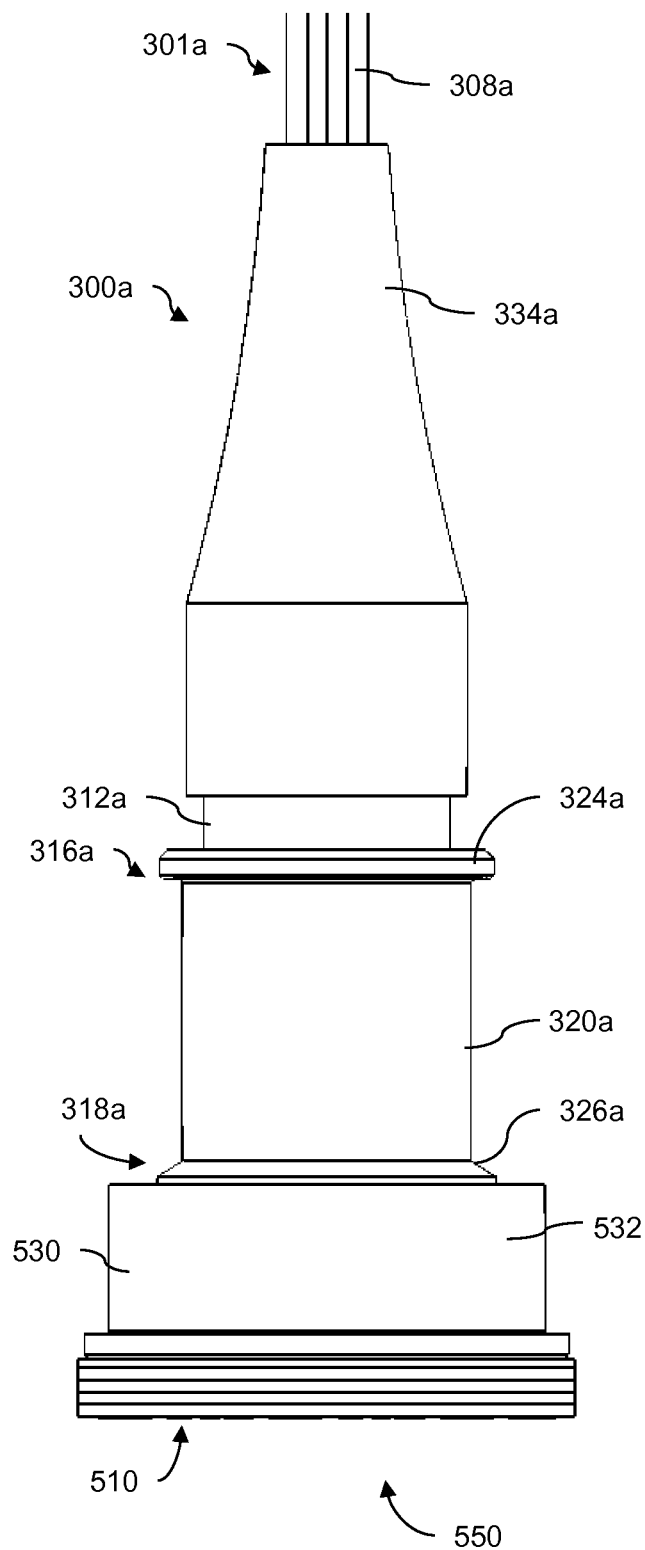
FIG. 9A is a perspective view of an embodiment of an optoelectronic subassembly.
Figure 9B:
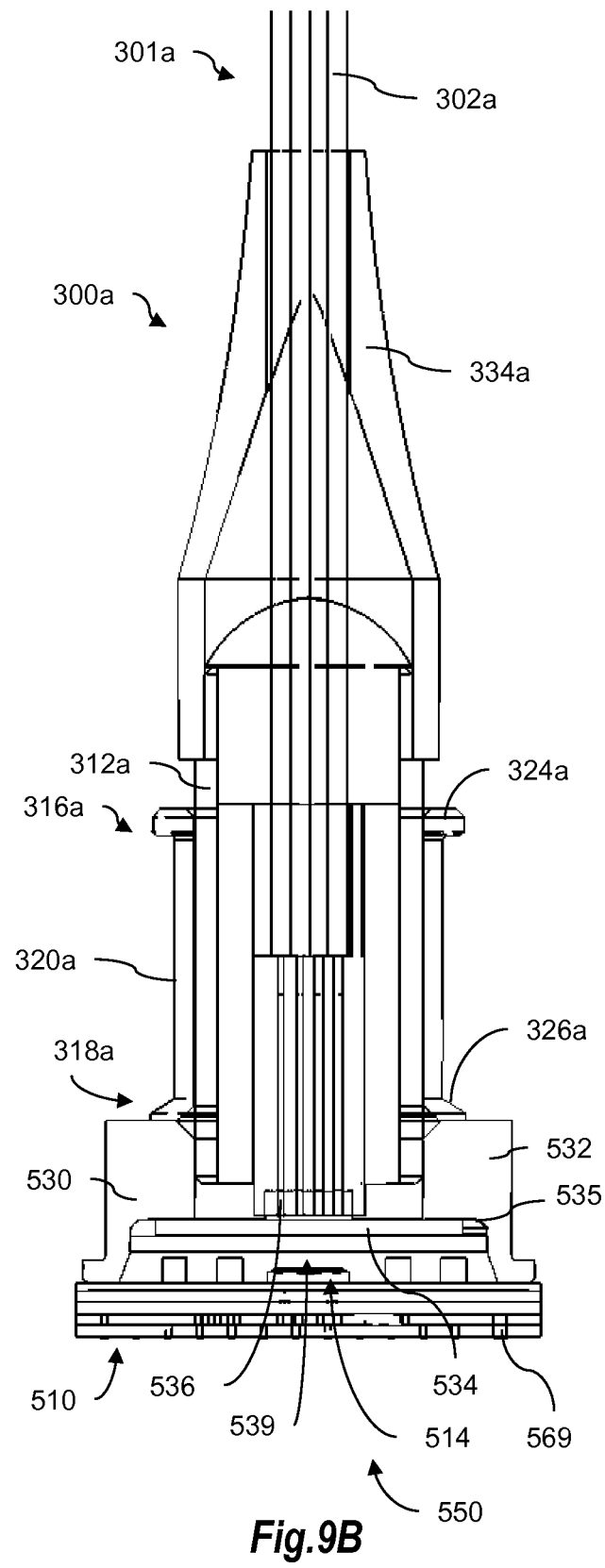
FIG. 9B is a side cross section of the optoelectronic subassembly of FIG. 9A.

Turning to FIGS. 9A-9B, the ROSA 550 and the ferrule assembly 300a will be described in further detail. The ferrule assembly 300a may include an alignment sleeve 320a configured to facilitate alignment of the ferrule assembly 300a. The alignment sleeve 320a may include any or all suitable aspects described with respect to the alignment sleeve 320b. For example, the alignment sleeve 320a may include a cylindrical body with an upper sleeve flange 324a positioned on a sleeve top 316a and/or a lower sleeve flange 326a positioned on the sleeve bottom 318a. The alignment sleeve 320a may include a sleeve cavity (not labeled for clarity) with a configuration (e.g., shape and/or dimension) corresponding to the ferrule body 312a to receive the ferrule body 312a. The sleeve bottom 318a of the alignment sleeve 220a may be configured (e.g., shaped and/or dimensioned) to interface with the ROSA housing 530 at the lower sleeve flange 326a.

Figure 10A:
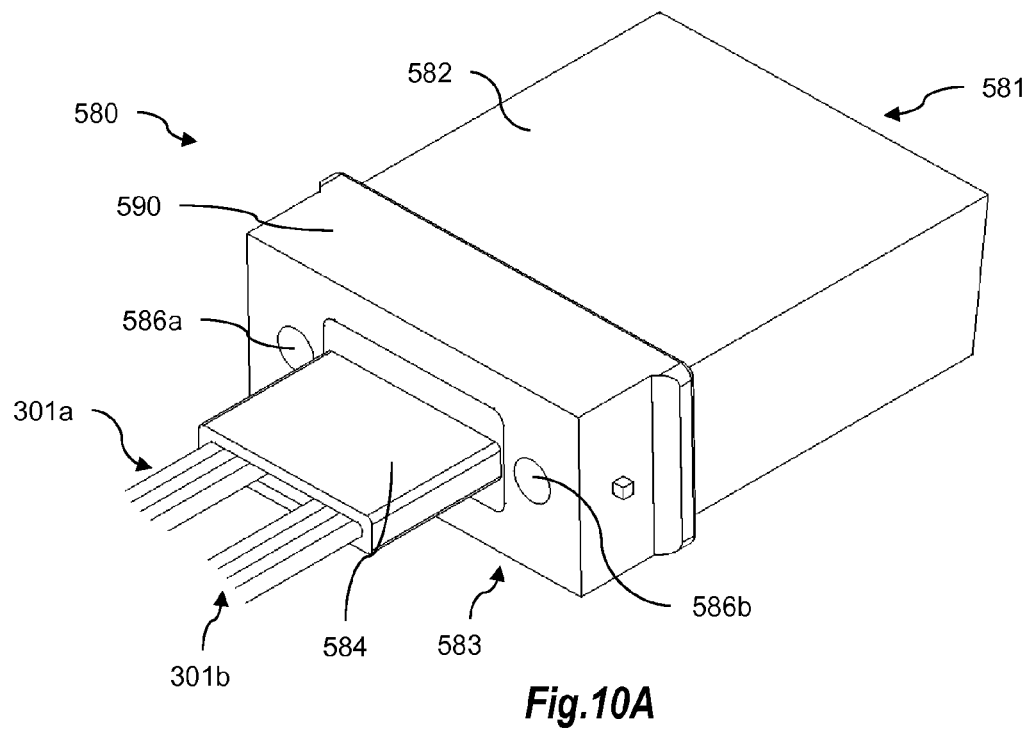
FIG. 10A is a perspective view of an embodiment of a connector subassembly.
Figure 10B:
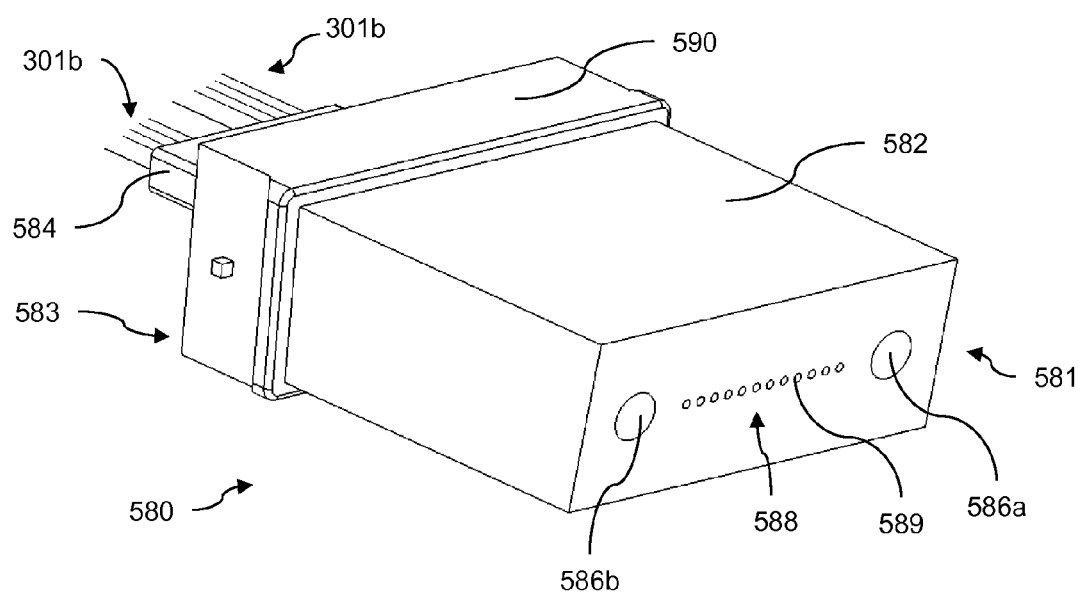
FIG. 10B is an another perspective view of the connector subassembly of FIG. 10A.

Turning to FIGS. 10A-10B, the connector subassembly 580 will be described in further detail. The connector subassembly 580 may be configured to couple the optoelectronic assembly 500 to other components of fiber optic networks. The connector subassembly 580 may include a connector body 582 extending between a connector front 583 and a connector back 581. The connector body 582 may receive and retain the optical cables 301a and/or the optical cables 301b at the connector front 583 with the optical cables 301a, 301b at least partially surrounded by the connector body 582.

The optical fibers 302a, 302b of corresponding optical cables 301a, 301b may extend the length of the connector body 582 and terminate at an optical fiber connection 588 positioned at the connector back 581. The optical fiber connection 588 may include a plurality of fiber couplings 589 (only one of which is labeled for clarity). As illustrated, in some configurations the optical fiber connection 588 may include twelve (12) fiber couplings 589, four (4) of which correspond to optical fibers 302a, and four (4) of which correspond to optical fibers 302b. In such configurations, the optical fiber connection 588 may include four (4) inoperative fiber couplings. However, these inoperative fiber couplings may be operative when the optoelectronic assembly 500 is configured to transmit and/or receive more than 4 channels. For example, in some configurations, the optoelectronic assembly 500 can be configured to transmit and receive 5 or 6 channels. In other configurations, the optoelectronic assembly 500 can be configured to transmit 12 channels and receive none, or receive 12 channels and transmit none.

In further configurations, the optical fiber connection 588 may include any suitable number of the fiber couplings 589, including more or less than twelve (12). In such configurations, the optoelectronic assembly 500 can include any suitable number of optical fibers 302a-b and/or inoperative fiber couplings. In configurations of the optoelectronic assembly 500 that include more than 6 transmitted and received channels, the optical fiber connection 588 may include more than twelve (12) fiber couplings 589 and the optoelectronic assembly 500 may include more than twelve (12) of the optical fibers 302a-b.

The inoperative fiber couplings may be optical fibers or other suitable optical couplings that are not connect to the optical fibers 302a, 302b. In some configurations, the inoperative fiber couplings may be omitted. In some configurations, the optical fibers 302a, 302b may not extend the length of the connector body 582 and may be optically coupled to the optical fiber connection 588 by intermediary optical couplings such as optical fibers, lenses, mirrors, or any other suitable optical coupling.

The connector subassembly 580 may include a fiber sleeve 584 positioned at the connector front 583. As illustrated, the fiber sleeve 584 may surround a portion of the optical cables 301a, 301b and may support and/or protect the optical cables 301a, 301b. For example, the fiber sleeve 584 may protect the optical cables 301a, 301b by dispersing forces acting on the optical cables 301a, 301b. In some configurations, the fiber sleeve 584 may disperse forces acting on the optical cables 301a, 301b at or near the connector front 583. The forces may be dispersed from the optical cables 301a, 301b to the connector body 582 or from one of the optical cables 301a, 301b to other optical cables 301a, 301b.

Although in the illustrated configuration the fiber sleeve 584 surrounds both sets of the optical cables 301a, 301b, in other configurations multiple fiber sleeves may be included. For example. In some configurations, each of the optical cables 301a, 301b may include its own corresponding fiber sleeve. In other configurations, sets of the optical cables 301a, 301b may include corresponding fiber sleeves. For example, the optical cables 301a may include a first fiber sleeve and the optical cables 301b may include a second fiber sleeve. In some configurations, other fiber sleeve configurations may be implemented.

The connector body 582 may include periphery 590 positioned at the connector front 583. As illustrated, the periphery 590 may include a cross section larger than the remaining portion of the connector body 582. The periphery 590 may include at least one dimension (e.g., height, width, length, diameter, etc.) larger than at least one corresponding dimension of the remaining portion of the connector body 582. In some configurations, at least a portion of the connector body 582 may be positioned within a receptacle to couple the connector subassembly 580 to another component. In such configurations, the periphery 590 may act as a stop to prevent the connector body 582 from being inserted too far into the receptacle of another component. Additionally or alternatively, the periphery 590 may contribute to coupling the connector subassembly 580 another component.

As illustrated, the connector body 582 may be rectangular and may be dimensioned and shaped to be inserted into a corresponding rectangular receptacle. The connector body 582 may be formed of a resilient or plastic material such that the connector body 582 may be positioned within the receptacle and retain itself within the receptacle to fix the connector subassembly 580 with respect to another component and optically couple the optical fibers 302a, 302b with another component.

The optical fiber connection 588 and/or the fiber couplings 589 may be positioned with respect to one another and/or the connector body 582 such that the fiber couplings 589 are optically aligned when the connector body 582 is positioned within a receptacle. For example, in the illustrated configuration the fiber couplings 589 are linearly aligned and may optically align with corresponding linearly aligned optical couplings of another component. In other configurations, the connector body 582 may be any suitable shape or configuration, for example, circular or cylindrical, triangular, quadrilateral, or other configurations. Additionally or alternatively, the fiber couplings 589 may include any suitable configuration besides linear, for example, the fiber couplings 589 may be arranged in multiple rows or may include a circular or offset configuration, or any other suitable configuration.

The connector body 582 may define a first opening 586a and a second opening 586b extending the length of the connector body 582. In non-illustrated configurations, the first opening 586a and/or second opening 586b may not extend the entire length of the connector body 582 and may be positioned on one side of the connector body 582, such as the connector back 581 or the connector front 583. In other configurations, the first opening 586a and/or second opening 586b may not extend the entire length of the connector body 582 but may be positioned on both the connector back 581 and the connector front 583. In some configurations, the first and/or second openings 586a, 586b may facilitate aligning or coupling the connector subassembly 580 and other components. For example, the first and/or second openings 586a, 586b may receive a coupling or alignment feature of another component. In such configurations, the first and/or second openings 586a, 586b may optically align the optical fiber connection 588 when the alignment feature of the other component is positioned within the first and/or second openings 586a, 586b.

In some configurations, the first and/or second openings 586a, 586b may be asymmetrically positioned with respect to one another and/or the connector body 582. In such configurations of the first and/or second openings 586a, 586b may permit the connector subassembly 580 to be coupled with another component or inserted into a receptacle in only one direction. Although in the illustrated configuration the first and second openings 586a, 586b are circular, in other configurations one or both of the first and second openings 586a, 586b may be any other suitable configuration such as oval, rectangular, diamond shaped or other suitable configuration. In some configurations, the first and second openings 586a, 586b may include different configurations such that the connector subassembly 580 may be coupled with another component or inserted into a receptacle in only one direction. For example, in some configurations the first opening 586a may be circular and the second opening 586b may be rectangular.

Although the Figures illustrate examples incorporating certain types of connectors, the disclosed principles can be applied to other connector types now known or used in the future. This may include, but is not limited to, LC, ST, SC, and FC varieties, and other cross-sectional shapes or types of connectors. In some aspects, the type of connector used may dictate its dimensions, size and configuration, and its general shape (e.g., circular, square, rectangular, etc.).

The optoelectronic assembly 500 ferrule may include any suitable aspects of U.S. patent application Ser. No. 14/831,499, filed Aug. 20, 2015, entitled LENS RECEPTACLES and U.S. Provisional Application 62/039,758, filed Aug. 20, 2014, entitled LENS RECEPTACLES which are both hereby incorporated by reference in their entirety. Aspects of "Lens Receptacles" may be incorporated in the configurations of the optoelectronic assembly 500, the ferrule assemblies 300a-b, the ROSA housing 530, the TOSA housing 540, the optical component 100, the connector subassembly 580, or other suitable elements.

In one example, a multi-channel optoelectronic subassembly may include a multi-channel header subassembly with a plurality of optoelectronic transducers on a substrate, a housing defining a housing cavity and including an optically transmissive portion, a ferrule assembly retaining optical fibers and an alignment sleeve with a sleeve cavity sized and shaped to receive the ferrule assembly. At least one of the optoelectronic transducers may be configured to transmit and/or receive optical signals corresponding to one channel.

In some configurations, the housing may be coupled to the header subassembly with the optoelectronic transducers at least partially positioned within the housing cavity. In some configurations, the housing may hermetically enclose the optoelectronic transducers. In some configurations, the housing may include a lens array having a plurality of lenses on the optically transmissive portion of the housing. In some configurations, the lenses may be optically transmissive surfaces of the housing.

In some configurations, the multi-channel optoelectronic subassembly may include an optical component positioned over the optically transmissive portion of the housing. In some configurations, the optical component may include one or more of: an isolator, a lens, a prism, a mirror or a filter. In some configurations, the ferrule assembly may include an upper clamp member and a lower clamp member retaining the optical fibers positioned between the upper and lower clamp members, and a ferrule body surrounding at least a portion of the upper and lower clamp members.

In some configurations, the sleeve cavity may be shaped and dimensioned to receive the ferrule body such that the ferrule body may be configured to be longitudinally positioned with respect to the alignment sleeve. In some configurations, the ferrule body may be cylindrical, the alignment sleeve may be cylindrical, and the ferrule body may be configured to be rotated with respect to the alignment sleeve when positioned at least partially within the alignment sleeve. In some configurations, the ferrule body may be positioned inside of the sleeve cavity and fixed to the alignment sleeve. In some configurations, the ferrule assembly may be positioned inside of the sleeve cavity and fixed to the alignment sleeve. In some configurations, the alignment sleeve may be fixed to the housing. In some configurations, the ferrule assembly may include a boot surrounding a portion of the optical fibers and the ferrule body.

In some configurations, the optoelectronic transducers may be receivers forming a receiver array optically aligned with the optically transmissive portion of the housing and the optical fibers. In some configurations, the optoelectronic transducers may be receivers forming a receiver array configured to receive optical signals from the optical fibers through the optically transmissive portion of the housing. In some configurations, the optoelectronic transducers may be lasers forming a laser array optically aligned with the optically transmissive portion of the housing and the optical fibers. In some configurations, the optoelectronic transducers may be lasers forming a laser array configured to transmit optical signals through the optically transmissive portion of the housing to the optical fibers. In some configurations, at least one of the optoelectronic transducers may be optically aligned with at least one lens of the lens array. In some configurations, at least one of the optoelectronic transducers may be optically aligned with the optical component. In some configurations, the ferrule assembly may be coupled to a first end of the optical fibers and a connector subassembly may be coupled to a second end of the optical fibers.

In some configurations, the connector subassembly may include one or more of: a connector body extending between a connector front and a connector back, the connector body receiving the optical fibers at the connector front with the optical fibers retained at least partially surrounded by the connector body; an optical fiber connection with a plurality of fiber couplings, the optical fibers extending through the connector body from the connector front to the optical fiber connection on the connector back; a fiber sleeve surrounding a portion of the optical fibers positioned at the connector front; a first opening and a second opening, the first and second openings extending through the connector body from the connector front to the connector back; or a periphery of the connector body positioned at the connector front, the periphery may include at least one dimension larger than at least one corresponding dimension of a remaining portion of the connector body.

In some configurations, the substrate may include a bottom layer, a top layer having top thin film signal lines, and one or more intermediate layers having thick film traces between the top layer and the bottom layer, the thick film traces may be electrically coupled to the top thin film signal lines.

In some configurations, the multi-channel optoelectronic subassembly may include vias extending through at least a portion of the substrate, the vias may be electrically coupled to the top thin film signal lines and/or the thick film traces. In some configurations, the multi-channel optoelectronic subassembly may include at least one bottom electrical component on the bottom layer, the bottom electrical component may be operably coupled with at least one of the optoelectronic transducers.

In another example, a multi-channel optoelectronic subassembly may include: a ROSA including a ROSA header with receivers on a first substrate and a ROSA housing coupled to the ROSA header and may at least partially enclose the receivers within a ROSA housing cavity; a TOSA including a TOSA header with transmitters on a second substrate and a TOSA housing coupled to the TOSA header and may at least partially enclose the transmitters within a ROSA housing cavity; a first ferrule assembly that may retain first optical fibers and a second ferrule assembly retaining second optical fibers; and a first alignment sleeve with a first sleeve cavity sized and shaped to receive the first ferrule assembly and a second alignment sleeve with a second sleeve cavity sized and shaped to receive the second ferrule assembly.

In some configurations, the ROSA housing may include a first optically transmissive portion capable of permitting optical signals to travel to the receivers and the TOSA housing may include a second optically transmissive portion capable of permitting optical signals to travel from the transmitters. In some configurations, the ROSA housing may hermetically enclose the receivers and/or the TOSA housing may hermetically enclose the transmitters.

In some configurations, the multi-channel optoelectronic subassembly may include a lens array having a plurality of lenses on the first optically transmissive portion and/or the second optically transmissive portion. In some configurations, the lenses may be optically transmissive surfaces of the ROSA housing and/or the TOSA housing.

In some configurations, the multi-channel optoelectronic subassembly may include an optical component positioned over the first optically transmissive portion or the second optically transmissive portion. In some configurations, the optical component may include one or more of: an isolator, a lens, a prism, a mirror or a filter.

In some configurations, the first ferrule assembly may be configured to be longitudinally positioned with respect to the first alignment sleeve and/or the second ferrule assembly may be configured to be longitudinally positioned with respect to the second alignment sleeve. In some configurations, the first ferrule assembly may be positioned inside of the first sleeve cavity and fixed to the first alignment sleeve and the second ferrule assembly may be positioned inside of the second sleeve cavity and fixed to the second alignment sleeve.

In some configurations, the first ferrule assembly may be cylindrical, the first alignment sleeve may be cylindrical, and the first ferrule assembly may be configured to be rotated with respect to the first alignment sleeve when positioned at least partially within the first alignment sleeve. In some configurations, the second ferrule assembly may be cylindrical, the second alignment sleeve may be cylindrical, and the second ferrule assembly may be configured to be rotated with respect to the second alignment sleeve when positioned at least partially within the second alignment sleeve. In some configurations, the first alignment sleeve may be fixed to the ROSA housing and the second alignment sleeve may be fixed to the TOSA housing.

In some configurations, the receivers or the transmitters may be optically coupled with the lens array. In some configurations, the receivers may be optically coupled with the first optical fibers and the transmitters may be optically coupled with the second optical fibers. In some configurations, the multi-channel optoelectronic subassembly may include a first boot surrounding a portion of the first optical fibers and the first ferrule assembly and a second boot surrounding a portion of the second optical fibers and the second ferrule assembly. In some configurations, the first ferrule assembly may be coupled to a first end of the first optical fibers and a connector subassembly may be coupled to a second end of the first optical fibers and the second ferrule assembly may be coupled to a first end of the second optical fibers and the connector subassembly may be coupled to a second end of the second optical fibers.

In some configurations, the connector subassembly may include one or more of: a connector body extending between a connector front and a connector back, the connector body receiving the first and second optical fibers at the connector front with the first and second optical fibers retained at least partially surrounded by the connector body; an optical fiber connection with a plurality of fiber couplings, the first and second optical fibers extending through the connector body from the connector front to the optical fiber connection on the connector back; a fiber sleeve surrounding a portion of the first and second optical fibers positioned at the connector front; a first opening and a second opening, the first and second openings extending through the connector body from the connector front to the connector back; or a periphery of the connector body positioned at the connector front, the periphery may include at least one dimension larger than at least one corresponding dimension of a remaining portion of the connector body.

In some configurations, the first or the second substrates may include one or more of: a bottom layer; a top layer having top thin film signal lines; one or more intermediate layers having thick film traces between the top layer and the bottom layer, the thick film traces may be electrically coupled to the top thin film signal lines; vias extending through at least a portion of the first substrate, the vias electrically coupled to the top thin film signal lines and/or the thick film traces; or at least one bottom electrical component on the bottom layer, the bottom electrical component operably coupled with the vias.

In yet another example, a method may include: providing a ROSA header that may include receivers on a first substrate, at least one of the receivers may be configured to receive optical signals corresponding to one channel; providing a ROSA housing defining a ROSA housing cavity and including a first optically transmissive portion; providing a TOSA header that may include transmitters on a second substrate, at least one of the transmitters may be configured to transmit optical signals corresponding to one channel; providing a TOSA housing defining a TOSA housing cavity and including a second optically transmissive portion; providing a first ferrule assembly retaining first optical fibers and a second ferrule assembly retaining second optical fibers; and providing a first alignment sleeve with a first sleeve cavity sized and shaped to receive the first ferrule assembly and a second alignment sleeve with a second sleeve cavity sized and shaped to receive the second ferrule assembly.

In some configurations, the method may include forming a ROSA by coupling the ROSA housing to the ROSA header and at least partially enclosing the receivers within the ROSA housing cavity. In some configurations, the method may include forming a TOSA by coupling the TOSA housing to the TOSA header and at least partially enclosing the transmitters within the TOSA housing cavity. In some configurations, the ROSA housing may hermetically seal the receivers and the TOSA housing hermetically seals the transmitters.

In some configurations, the method may include positioning the first ferrule assembly inside of the first sleeve cavity of the first alignment sleeve and positioning the second ferrule assembly inside of the second sleeve cavity of the second alignment sleeve. In some configurations, the method may include optically aligning at least one of the receivers and at least one of the first optical fibers and optically aligning at least one of the transmitters and at least one of the second optical fibers. In some configurations, the method may include fixing the first ferrule assembly to the first alignment sleeve and fixing the second ferrule assembly to the second alignment sleeve.

In some configurations, the method may include optically aligning each of the receivers with one of the first optical fibers and optically aligning each of the transmitters with one of the second optical fibers. In some configurations, the method may include fixing the first alignment sleeve to the ROSA housing and fixing the second alignment sleeve to the TOSA housing. In some configurations, the method may include positioning a first boot around a portion of the first optical fibers and the first ferrule assembly and positioning as second boot around a portion of the second optical fibers and the second ferrule assembly.

In some configurations, the method may include providing a connector subassembly having one or more of: a connector body extending between a connector front and a connector back, the connector body receiving the first and second optical fibers at the connector front with the first and second optical fibers retained at least partially surrounded by the connector body; an optical fiber connection with a plurality of fiber couplings, the first and second optical fibers extending through the connector body from the connector front to the optical fiber connection on the connector back; a fiber sleeve surrounding a portion of the first and second optical fibers positioned at the connector front; a first opening and a second opening, the first and second openings extending through the connector body from the connector front to the connector back; or a periphery of the connector body positioned at the connector front, the periphery may include at least one dimension larger than at least one corresponding dimension of a remaining portion of the connector body. In some configurations, the method may include coupling a connector subassembly to the first optical fibers and the second optical fibers.

In some configurations, the first or the second substrate may include one or more of: a bottom layer; a top layer having top thin film signal lines; one or more intermediate layers having thick film traces between the top layer and the bottom layer, the thick film traces may be electrically coupled to the top thin film signal lines; vias extending through at least a portion of the first substrate, the vias electrically coupled to the top thin film signal lines and/or the thick film traces; or at least one bottom electrical component on the bottom layer, the bottom electrical component operably coupled with the vias.

The described examples are illustrative and not restrictive and aspects of the present disclosure may be embodied in forms other than those illustrated. The scope of the claimed subject matter is indicated by the appended claims rather than by the foregoing description. All changes that come within the meaning and range of equivalency of the claims are to be embraced within their scope.

What is claimed is:

1. A multi-channel optoelectronic subassembly comprising:
   a multi-channel header subassembly including a plurality of optoelectronic transducers on a substrate, at least one of the optoelectronic transducers being configured to transmit and/or receive optical signals corresponding to one channel;
   a housing defining a housing cavity and including an optically transmissive portion;
   a ferrule assembly retaining optical fibers, the ferrule assembly comprising a cylindrical ferrule body;
   a cylindrical alignment sleeve that defines a sleeve cavity, the sleeve cavity sized and shaped to receive the ferrule body such that the ferrule body is repositionable in a longitudinal direction and a rotational direction with respect to the alignment sleeve when the ferrule body is positioned inside of the sleeve cavity and wherein the ferrule body extends entirely through the sleeve cavity.

2. The multi-channel optoelectronic subassembly of claim 1, wherein the housing is coupled to the header subassembly with the optoelectronic transducers at least partially positioned within the housing cavity such that the housing hermetically encloses the optoelectronic transducers.

3. The multi-channel optoelectronic subassembly of claim 2, the housing further comprising a lens array having a plurality of lenses on the optically transmissive portion of the housing, wherein the lenses are optically transmissive convex surfaces of the housing.

4. The multi-channel optoelectronic subassembly of claim 1, further comprising an optical component positioned over the optically transmissive portion of the housing, the optical component including one or more of: an isolator, a prism, a mirror or a filter.

5. The multi-channel optoelectronic subassembly of claim 1, the ferrule assembly comprising an upper clamp member and a lower clamp member at least partially surrounded by the ferrule body.

6. The multi-channel optoelectronic subassembly of claim 1, wherein the ferrule body is positioned inside of the sleeve cavity and fixed to the alignment sleeve and the alignment sleeve is fixed to the housing.

7. The multi-channel optoelectronic subassembly of claim 6, wherein the optoelectronic transducers are receivers forming a receiver array or lasers forming a laser array, the optoelectronic transducers optically aligned with the optically transmissive portion of the housing and the optical fibers.

8. A multi-channel optoelectronic subassembly comprising:
  a receiver optoelectronic subassembly ("ROSA") including a ROSA header with receivers on a first substrate and a ROSA housing coupled to the ROSA header and at least partially enclosing the receivers within a ROSA housing cavity, wherein the ROSA housing hermetically encloses the receivers and includes a first optically transmissive portion capable of permitting optical signals to travel to the receivers;
  a transmitter optoelectronic subassembly ("TOSA") including a TOSA header with transmitters on a second substrate and a TOSA housing coupled to the TOSA header and at least partially enclosing the transmitters within a TOSA housing cavity, wherein the TOSA housing hermetically encloses the transmitters and includes a second optically transmissive portion capable of permitting optical signals to travel from the transmitters;
  a first ferrule assembly retaining first optical fibers, the first ferrule assembly comprising a first cylindrical ferrule body;
  a second ferrule assembly retaining second optical fibers, the second ferrule assembly comprising a second cylindrical ferrule body;
  a first cylindrical alignment sleeve that defines a first sleeve cavity sized and shaped to receive the first ferrule assembly such that the first ferrule body is repositionable in a first longitudinal direction and a first rotational direction with respect to the first alignment sleeve when the first ferrule body is positioned inside of the first sleeve cavity; and
  a second cylindrical alignment sleeve that defines a second sleeve cavity sized and shaped to receive the second ferrule assembly such that the second ferrule body is repositionable in a second longitudinal direction and a second rotational direction with respect to the second alignment sleeve when the second ferrule body is positioned inside of the second sleeve cavity.

9. The multi-channel optoelectronic subassembly of claim 8, further comprising a lens array having a plurality of lenses on the first optically transmissive portion and/or the second optically transmissive portion, wherein the lenses are optically transmissive convex surfaces of the ROSA housing and/or the TOSA housing.

10. The multi-channel optoelectronic subassembly of claim 8, the first ferrule assembly positioned inside of the first sleeve cavity and fixed to the first alignment sleeve and the second ferrule assembly positioned inside of the second sleeve cavity and fixed to the second alignment sleeve.

11. The multi-channel optoelectronic subassembly of claim 10, wherein the first alignment sleeve is fixed to the ROSA housing and the second alignment sleeve is fixed to the TOSA housing.

12. The multi-channel optoelectronic subassembly of claim 9, wherein the receivers or the transmitters are optically coupled with the lens array.

13. A method comprising:
  coupling a receiver optoelectronic subassembly (ROSA) housing to a ROSA header to hermetically seal one or more receivers positioned on a first substrate within a ROSA housing cavity, the ROSA housing including a first optically transmissive portion and the receivers configured to receive optical signals corresponding to one channel;
  coupling a transmitter optoelectronic subassembly (TOSA) housing to a TOSA header to hermetically seal one or more transmitters positioned on a second substrate within a TOSA housing cavity, the TOSA housing including a second optically transmissive portion and the transmitters configured to transmit optical signals corresponding to one channel;
  positioning a first ferrule assembly that retains first optical fibers inside of a first sleeve cavity of a first alignment sleeve that is sized and shaped to receive the first ferrule assembly; and
  rotating and longitudinally positioning the first ferrule assembly relative to the first alignment sleeve when the first ferrule assembly is positioned inside of the first sleeve cavity to optically align at least one of the receivers or the transmitters with at least one of the first optical fibers.

14. The method of claim 13, further comprising positioning a second ferrule assembly retaining second optical fibers inside of a second sleeve cavity of a second alignment sleeve sized and shaped to receive the second ferrule assembly.

15. The method of claim 14, further comprising rotating and longitudinally positioning the second ferrule assembly relative to the second alignment sleeve to optically align at least a second one of the receivers or the transmitters and at least one of the second optical fibers.

16. The method of claim 15, further comprising fixing the first ferrule assembly to the first alignment sleeve and fixing the second ferrule assembly to the second alignment sleeve.

17. The method of claim 16, further comprising:
  optically aligning each of the receivers with one of the first optical fibers and optically aligning each of the transmitters with one of the second optical fibers; and
  fixing the first alignment sleeve to the ROSA housing and fixing the second alignment sleeve to the TOSA housing.

18. The multi-channel optoelectronic subassembly of claim 8, wherein the ferrule body extends entirely through sleeve cavity and is repositionable in a longitudinal direction and a rotational direction with respect to the alignment sleeve.

19. The method of claim 13, wherein the first ferrule assembly extends entirely through the first sleeve cavity as the first ferrule assembly is rotated and longitudinally positioned relative to the first alignment sleeve.

20. The multi-channel optoelectronic subassembly of claim 1, the alignment sleeve further comprising a flange positioned against the housing, the flange shaped to prevent the alignment sleeve from being inserted into the housing.

\* \* \* \* \*